(12) United States Patent
Suzuki et al.

(10) Patent No.: US 10,923,076 B2
(45) Date of Patent: Feb. 16, 2021

(54) DISPLAY DEVICE, DISPLAY SYSTEM, MOBILE OBJECT, DISPLAY-BRIGHTNESS CONTROL METHOD, AND RECORDING MEDIUM STORING PROGRAM CODE

(71) Applicants: Ryohhei Suzuki, Kanagawa (JP); Masato Kusanagi, Kanagawa (JP); Yuuki Suzuki, Kanagawa (JP); Kazuhiro Fujita, Tokyo (JP)

(72) Inventors: Ryohhei Suzuki, Kanagawa (JP); Masato Kusanagi, Kanagawa (JP); Yuuki Suzuki, Kanagawa (JP); Kazuhiro Fujita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/364,561

(22) Filed: Mar. 26, 2019

(65) Prior Publication Data
US 2019/0304402 A1 Oct. 3, 2019

(30) Foreign Application Priority Data

Mar. 27, 2018 (JP) .............................. JP2018-059561
Mar. 30, 2018 (JP) .............................. JP2018-069035

(51) Int. Cl.
*G09G 5/10* (2006.01)
*G02B 27/01* (2006.01)
*G09G 3/00* (2006.01)

(52) U.S. Cl.
CPC ............... *G09G 5/10* (2013.01); *G02B 27/01* (2013.01); *G02B 27/0101* (2013.01);
(Continued)

(58) Field of Classification Search
None
See application file for complete search history.

(56) References Cited

U.S. PATENT DOCUMENTS

2010/0007589 A1* 1/2010 Yeo ..................... G09G 3/3413
345/83
2011/0102483 A1 5/2011 Kanamori
(Continued)

FOREIGN PATENT DOCUMENTS

EP   2 849 175 A1   3/2015
JP   2004-299506   10/2004
(Continued)

OTHER PUBLICATIONS

The partial European Search Report dated Jul. 19, 2019 in Patent Application No. 19165264.3, 21 pages.

*Primary Examiner* — Ke Xiao
*Assistant Examiner* — Jed-Justin Imperial
(74) *Attorney, Agent, or Firm* — Oblon, McClelland, Maier & Neustadt, L.L.P.

(57) ABSTRACT

A display device, a display system, a mobile object, a display-brightness control method, and a recording medium storing program code. The display device and the display-brightness control method include obtaining brightness data indicating brightness in a peripheral area at prescribed time intervals, the peripheral area including at least some of a display area that serves as a background of display data, detecting a change in brightness in the peripheral area based on the brightness data obtained in the obtaining, determining display-brightness data that indicates display brightness when the change in brightness is detected, such that length of delay time before display brightness of the display data is made to correspond to the brightness of the peripheral area is equal to or shorter than a permissible delay time, and displaying the display data using the display-brightness data determined in the determining.

16 Claims, 23 Drawing Sheets

(52) U.S. Cl.
CPC ............. *G09G 3/001* (2013.01); *G09G 3/002* (2013.01); *G02B 2027/0118* (2013.01); *G09G 2320/0247* (2013.01); *G09G 2320/064* (2013.01); *G09G 2320/103* (2013.01); *G09G 2360/144* (2013.01); *G09G 2360/16* (2013.01); *G09G 2380/10* (2013.01)

(56) References Cited

U.S. PATENT DOCUMENTS

| | | | |
|---|---|---|---|
| 2015/0116192 A1* | 4/2015 | Yachida | G09G 3/3406 345/84 |
| 2017/0080801 A1* | 3/2017 | Ogata | B60K 35/00 |
| 2018/0070062 A1 | 3/2018 | Shitomi | |

FOREIGN PATENT DOCUMENTS

| | | |
|---|---|---|
| JP | 2008-001182 | 1/2008 |
| JP | 2013-239243 | 11/2013 |
| JP | 2017-072764 | 4/2017 |

\* cited by examiner

| CHANGES IN BRIGHTNESS [cd/m²] | 100→500 | 100→1000 | 100→1800 |
|---|---|---|---|
| DELAY TIME [s] WHERE 80% OF VIEWERS DO NOT FEEL AWKWARD ABOUT CHANGES IN DISPLAY BRIGHTNESS | 6.9 | 1.7 | 1.45 |

| CHANGES IN BRIGHTNESS [cd/m²] | 500→100 | 1000→100 | 1800→100 |
|---|---|---|---|
| DELAY TIME [s] WHERE 80% OF VIEWERS DO NOT FEEL AWKWARD ABOUT CHANGES IN DISPLAY BRIGHTNESS | 1.9 | 2 | 2.1 |

DISPLAY DEVICE, DISPLAY SYSTEM, MOBILE OBJECT, DISPLAY-BRIGHTNESS CONTROL METHOD, AND RECORDING MEDIUM STORING PROGRAM CODE

CROSS-REFERENCE TO RELATED APPLICATIONS

This patent application is based on and claims priority pursuant to 35 U.S.C. § 119(a) to Japanese Patent Application Nos. 2018-059561 and 2018-069035, filed on Mar. 27, 2018, and Mar. 30, 2018, respectively, in the Japan Patent Office, the entire disclosures of which are hereby incorporated by reference herein.

BACKGROUND

Technical Field

Embodiments of the present disclosure relate to a display device, a display system, a mobile object, a display-brightness control method, and a recording medium storing program code.

Background Art

Display devices such as a heads-up display (HUD) are used as an application in a mobile object such as a vehicle that allows a driver (viewer) to recognize various kinds of information (for example, vehicle information, navigation information, and warning information) with a reduced amount of movement in line of vision. For such display devices provided for a vehicle, technologies are known in the art to control the display brightness according to the brightness around the vehicle such that high visual recognizability is achieved for a driver.

By contrast, when the display brightness is adjusted to match the changes in brightness around the vehicle, for example, screen flicker is caused by abrupt changes in brightness around the vehicle, and the visibility of the display for the driver may be impaired. In order to handle such a situation, technologies are known in the art to reduce the screen flicker caused due to abrupt changes in brightness around a vehicle so as to improve the visibility of the display for the driver.

SUMMARY

Embodiments of the present disclosure described herein provide display device, a display system, a mobile object, a display-brightness control method, and a recording medium storing program code. The display device and the display-brightness control method include obtaining brightness data indicating brightness in a peripheral area at prescribed time intervals, the peripheral area including at least some of a display area that serves as a background of display data, detecting a change in brightness in the peripheral area based on the brightness data obtained in the obtaining, determining display-brightness data that indicates display brightness when the change in brightness is detected, such that length of delay time before display brightness of the display data is made to correspond to the brightness of the peripheral area is equal to or shorter than a permissible delay time, and displaying the display data using the display-brightness data determined in the determining. The display system includes the display device, a detector to detect the brightness of the peripheral area, a reflector to reflect diverging light diverging through the optical element, and an imaging optical system to project the diverging light diverging through the optical element towards the reflector to form the virtual image. The mobile object includes the display system, and the reflector is a front windshield. The recording medium stores the program code for causing a computer to execute the display-brightness control method.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
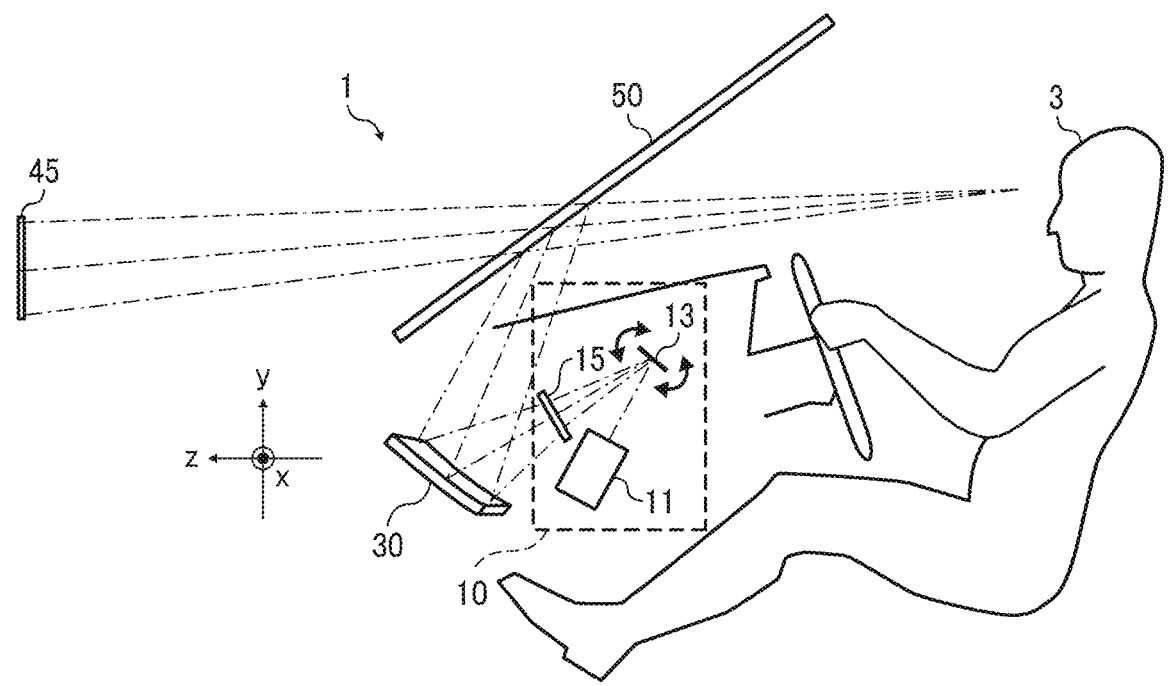
FIG. 1 is a diagram illustrating a system configuration of a display system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described below with reference to the accompanying drawings. In the description of the drawings, like reference signs denote like elements, and overlapping descriptions are omitted.

Embodiments

System Configuration

FIG. 1 is a diagram illustrating a system configuration of a display system 1 according to an embodiment of the present disclosure. In the display system 1 as illustrated in FIG. 1, a viewer 3 can visually identify display data as the projection light that is projected from a display device 10 is projected onto a transmissive reflector. The display data is image data superimposed on the viewing field of the viewer 3 as a virtual image 45.

For example, the display system 1 is provided for a mobile object such as a vehicle, an aircraft, and a ship, or an immobile object such as a maneuvering simulation system, and a home-theater system. In the present embodiment, cases in which the display system 1 is provided for a vehicle as an example of the mobile object is described. However, no limitation is intended thereby, and the type of usage of the display system 1 is not limited to the present embodiment.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In this configuration, the front windshield 50 serves as a transmissive reflector that transmits some of the incident light and reflects at least some of the remaining incident light. The distance between the location of the eyepoint of the viewer 3 and the front windshield 50 is about several tens of centimeters (cm) to one meter (m).

The display system 1 includes a display device 10, a free-form surface mirror 30, and a front windshield 50. For example, the display device 10, is a heads-up display (HUD) provided for a vehicle as an example of the mobile object. The display device 10 may be arranged at any desired position in conformity with the interior design of the vehicle. For example, the display device 10 according to the present embodiment may be disposed under the dashboard of the vehicle or built into the dashboard of the vehicle.

The display device 10 includes a light-source device 11, a light deflector 13, and a screen 15. The light-source device 11 is a device that emits the laser beams emitted from a light source outside the device. For example, the light-source device 11 may emit laser beams in which three-color laser beams of red, green, and blue (RGB) are combined. The laser beams emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 is a device that uses, for example, the micro-electromechanical systems (MEMS) to change the directions of travel of the laser beams. The light deflector 13 is configured by a scanner such as a mirror system composed of one minute MEMS mirror that pivots around two axes orthogonal to each other or two MEMS mirrors that pivot or rotates around one axis. The laser beams that are emitted from the light deflector 13 scan the screen 15. The light deflector 13 is not limited to a MEMS mirror, but may be configured by a polygon mirror or the like.

The screen 15 serves as a divergent part that diverges the laser beams at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. The screen 15 forms a two-dimensional intermediate image 40 on the screen 15 as the laser beams emitted from the light deflector 13 scan the surface of the screen 15.

A method of projecting an image using the display device 10 may be implemented by a panel system or a laser scanning system. In the panel system, the intermediate image 40 is formed by an imaging device such as a liquid crystal panel, a digital micromirror device (DMD) panel (digital mirror device panel), or a vacuum fluorescent display (VFD). In the laser scanning system, the intermediate image 40 is formed by scanning the laser beams emitted from the light-source device 11, using an optical scanner.

The display device 10 according to the present embodiment adopts the laser scanning system. In particular, in the laser scanning system, since emitting/non-emitting can be assigned to each pixel, in general, a high-contrast image can be formed. In some alternative embodiments, the above-described panel system may be adopted as the projection system in the display device 10.

The virtual image 45 is projected onto the free-form surface mirror 30 and the front windshield 50 as the intermediate image 40 that is formed by the laser beams (bundle of laser beams) emitted from the screen 15 is magnified for view. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around the rotation axis. Due to such a configuration, the free-form surface mirror 30 can adjust the reflection direction of the laser beams (bundle of laser beams) emitted from the screen 15 to change the position at which the virtual image 45 is displayed.

In the present embodiment, the free-form surface mirror 30 is designed using a commercially available optical design simulation software such that the free-form surface mirror 30 has a certain level of light-gathering power to achieve a desired image-forming position of the virtual image 45. In the display device 10, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m). The free-form surface mirror 30 may be a concave mirror or an element with a light-gathering power. The free-form surface mirror 30 is an example of an image forming optical system.

The front windshield 50 serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). The transmissive reflector may be another front windshield arranged in addition to the front windshield 50. The front windshield 50 is an example of a reflector.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

Due to such a configuration as above, the laser beams (bundle of laser beams) emitted from the screen 15 are projected towards the free-form surface mirror 30, and are reflected by the front windshield 50. Accordingly, the viewer 3 can visually recognize the virtual image 45, i.e., the magnified image of the intermediate image 40 formed on the screen 15, due to the light reflected by the front windshield 50.

Light-Source Device

Figure 2:
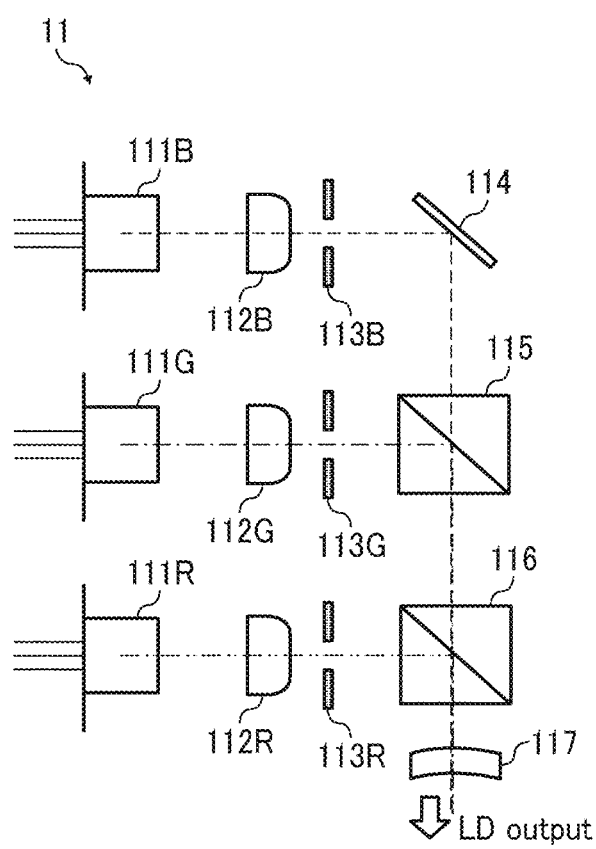
FIG. 2 is a diagram illustrating a specific configuration of a light-source device according to an embodiment of the present disclosure.

FIG. 2 is a diagram illustrating a specific configuration of the light-source device 11 according to the present embodiment.

The light-source device 11 includes light-source elements 111R, 111G, and 111B (these light-source elements may be referred to simply as a light-source element 111 in the following description when it is not necessary to distinguish each of the light-source elements), coupling lenses 112R, 112G, and 112B, apertures 113R, 113G, and 113B, combiners 114, 115, and 116, and a lens 117.

For example, each of the light-source elements 111R, 111G, and 111B of three colors (R, G, B) of three colors (red, green, and blue (RGB)) is a laser diode (LD) having a single or a plurality of light-emitting points. The light-source elements 111R, 111G, and 111B emit bundles of laser beams (light flux) having different wavelengths $\lambda R$, $\lambda G$, and $\lambda B$, respectively. For example, $\lambda R=640$ nanometers (nm), $\lambda G=530$ nm, and $\lambda B=445$ nm.

The emitted bundles of laser beams (light flux) are coupled by the coupling lenses 112R, 112G, and 112B, respectively. The coupled laser beams (bundles of laser beams) are shaped by the apertures 113R, 113G, and 113B, respectively. The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

The multiple laser beams (light flux) that are shaped by the apertures 113R, 113G, and 113B are combined by the three combiners 114, 115, and 116, respectively. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined bundle of laser beams passes through the lens 117 and is guided to the light deflector 13.

Light Deflector

Figure 3:
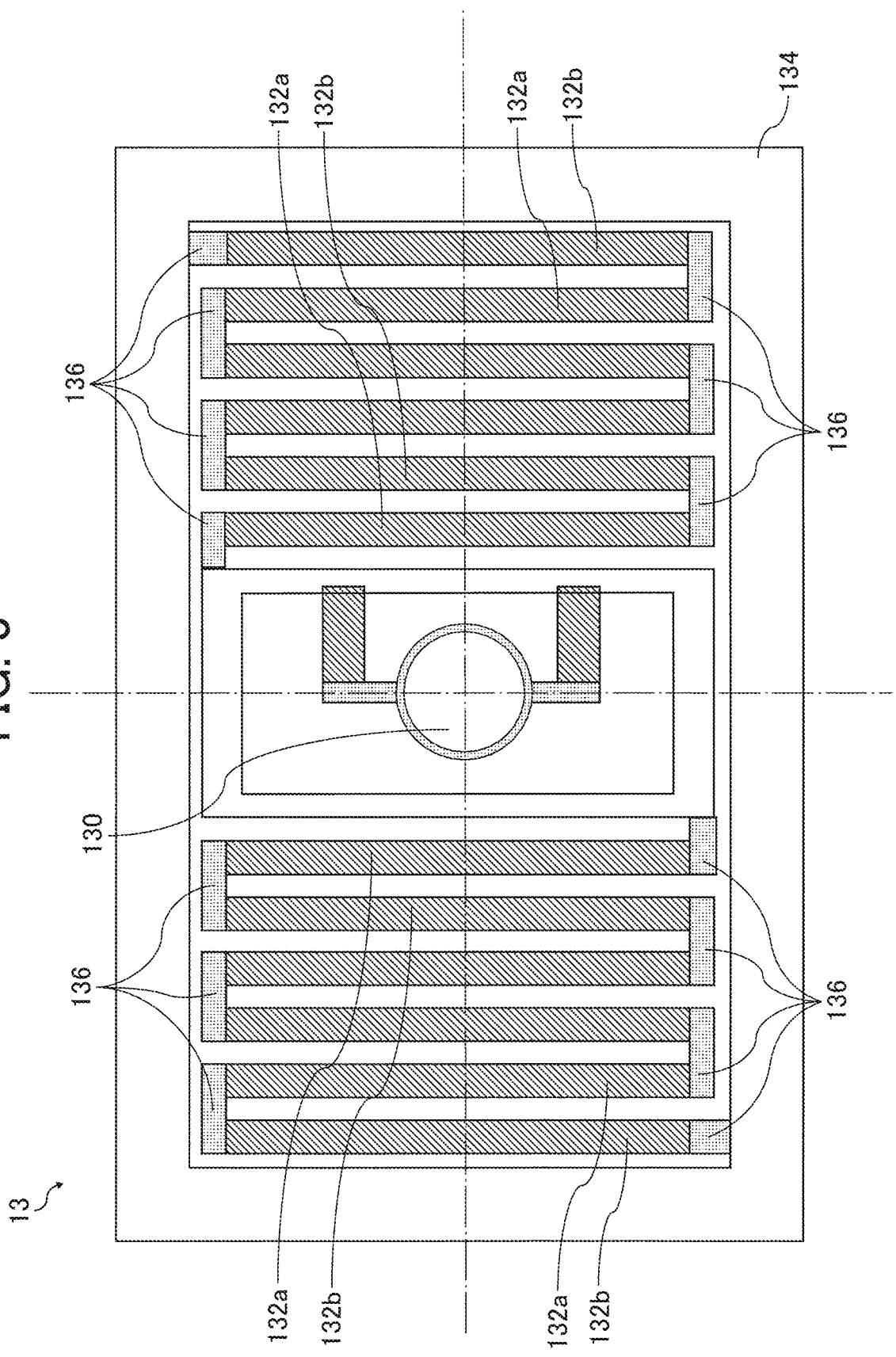
FIG. 3 is a diagram illustrating a specific configuration of a light deflector according to an embodiment of the present disclosure.

FIG. 3 is a diagram illustrating a specific configuration of the light deflector 13 according to the present embodiment.

The light deflector 13 is a MEMS mirror produced by semiconductor processing, and includes a mirror 130, a serpentine beam 132, a frame 134, and a piezoelectric member 136. The light deflector 13 is an example of a scanner.

The mirror 130 has a reflection plane that reflects the laser beams emitted from the light-source device 11 towards the screen 15 side. In the light deflector 13, a pair of serpentine beams 132 are formed across the mirror 130. Each of the pair of serpentine beams 132 has a plurality of turning portions. Each of these turning portions is configured by a first beam 132$a$ and a second beam 132$b$ that are arranged alternately. Each of the pair of serpentine beams 132 is supported by the frame 134. The piezoelectric member 136 is disposed such that the first beam 132$a$ and the second beam 132$b$, which are adjacent to each other, are coupled to each other. The piezoelectric member 136 applies different levels of voltage to the first beam 132$a$ and the second beam 132$b$ to bend each of the first beam 132$a$ and the second beam 132$b$ differently.

As a result, the first beam 132$a$ and the second beam 132$b$, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Screen

Figure 4:
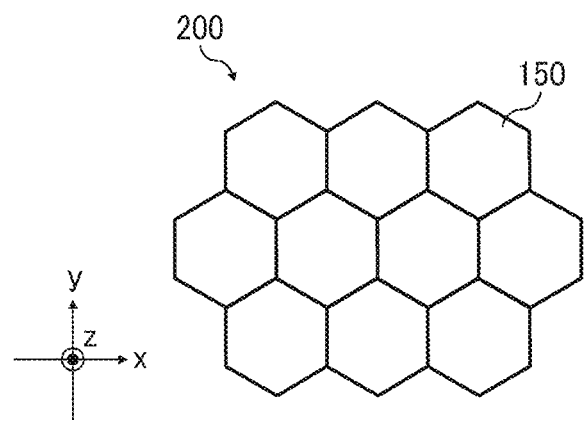
FIG. 4 is a diagram illustrating a specific configuration of a screen according to an embodiment of the present disclosure.

FIG. 4 is a diagram illustrating a specific configuration of the screen 15 according to the present embodiment.

The laser beams emitted from the LD 1007 that configures a part of the light-source device 11 form an image on the screen 15. The screen 15 serves as a divergent part that diverges the laser beams at a predetermined divergence angle. The screen 15 is an example of an optical element.

The screen 15 as illustrated in FIG. 4 has a microlens-array structure in which a plurality of hexagonal-shaped microlenses 150 are arranged with no gap therebetween. The width of each of the microlenses 150 (the distance between two sides that face each other) is approximately 200 micrometer (μm). As the microlenses 150 of the screen 15 have a hexagonal shape, the multiple microlenses 150 can be arrayed with high density.

Note that the shape of each of the microlenses 150 is not limited to a hexagonal shape. For example, in some embodiments, the microlenses 150 have a rectangular shape or a triangular shape. In the present embodiment, structure in which the multiple microlenses 150 are arrayed in a regularized manner is described. However, no limitation is intended thereby, and the arrangement of the microlenses 150 is not limited to this structure. For example, the centers of the multiple microlenses 150 may be decentered from each other, and the microlenses 150 may be arranged in an irregular manner. When such a decentered arrangement is adopted, those multiple microlenses 150 have different shapes from each other.

Figure 5A:
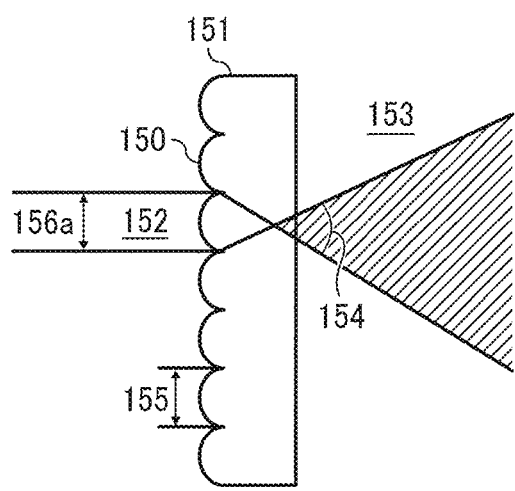
FIG. 5A and FIG. 5B are diagrams illustrating a difference in operation due to differences in sizes of the diameter of incident light flux and the lens diameter in a microlens array, according to an embodiment of the present disclosure.
Figure 5B:
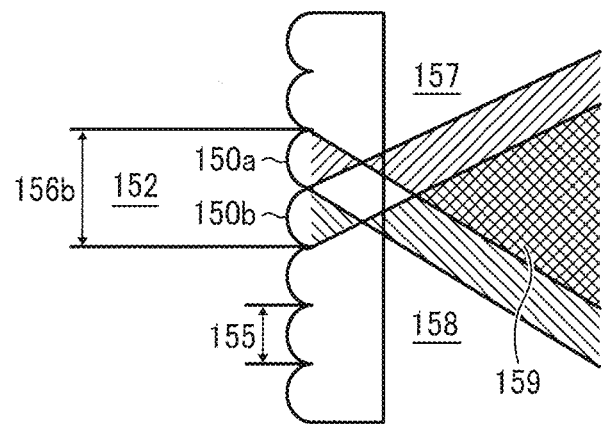

FIG. 5A and FIG. 5B are diagrams illustrating a difference in operation due to differences in sizes of the diameter of incident light flux and the lens diameter in the microlens array 200, according to the present embodiment.

In FIG. 5A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150 of the screen 15, the incident light 152 can diverge at a desired divergence angle 154. The intervals 155 at which the microlenses 150 are arranged is designed to be wider than the diameter 156$a$ of the incident light 152. Accordingly, the screen 15 does not cause interference among the lenses, and interfering noise can be prevented from occurring.

FIG. 5B is a diagram illustrating the optical paths of diverging lights when the diameter 156$b$ of the incident light 152 is twice wider than the intervals 155 at which the microlenses 150 are arranged. In the incident light 152, is incident on two microlenses 150$a$ and 150$b$, and these two microlenses 150$a$ and 150$b$ produce two diverging lights 157 and 158, respectively. In such cases, lights may interfere with each other as two diverging lights exist in an area 159. Such an interference between two diverging lights (coherent light) is visually recognized as an interfering noise by an observer.

In view of the above circumstances, the intervals 155 at which the microlenses 150 are arranged is designed to be wider than the diameter 156 of the incident light 152 in order to reduce the speckles. A configuration with convex lenses are described as above with reference to FIG. 5A and FIG. 5B. However, no limitation is indicated thereby, and advantageous effects can be expected in a similar manner in a configuration with concave lenses.

Figure 6:
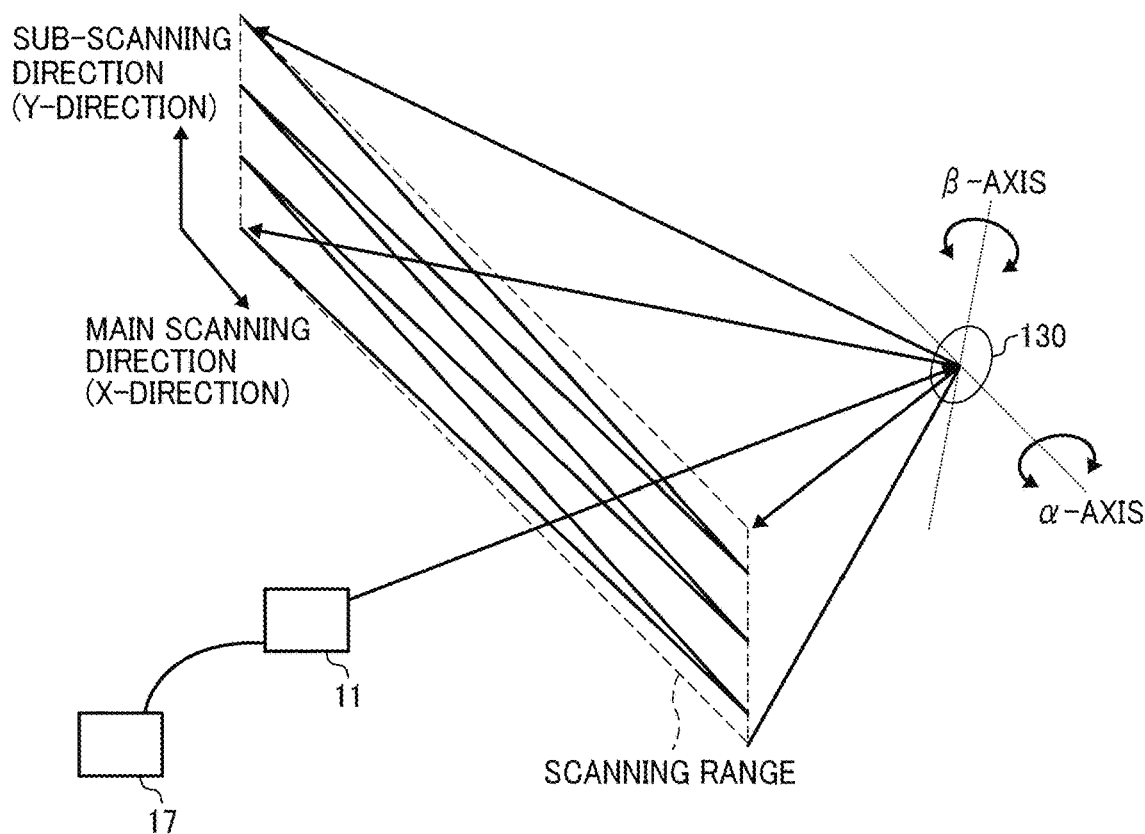
FIG. 6 is a diagram illustrating the relation between a mirror of a light deflector and the scanning range, according to an embodiment of the present disclosure.

FIG. 6 is a diagram illustrating the relation between a mirror of the light deflector 13 and the scanning range, according to the present embodiment.

The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 6, the laser beams that are emitted from the multiple light-source elements and whose optical paths are combined are two-dimensionally deflected about the a axis and the 13 axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beams scan (two-way scans) the scanning range of the screen 15 in an oscillating manner in the main scanning direction (X-axis direction) at a high frequency of about 20,000 to 40,000 hertz (Hz), and one-way scan the scanning range of the screen 15 in the sub-scanning direction (Y-axis direction) at a low frequency of about a few tens of Hz. In other words, the light deflector 13 performs raster scanning on the screen 15. In this configuration, the display device 10 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz. Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20,000 Hz and 50 Hz, respectively, the length of time to scan one frame is 20 msec.

Figure 7:
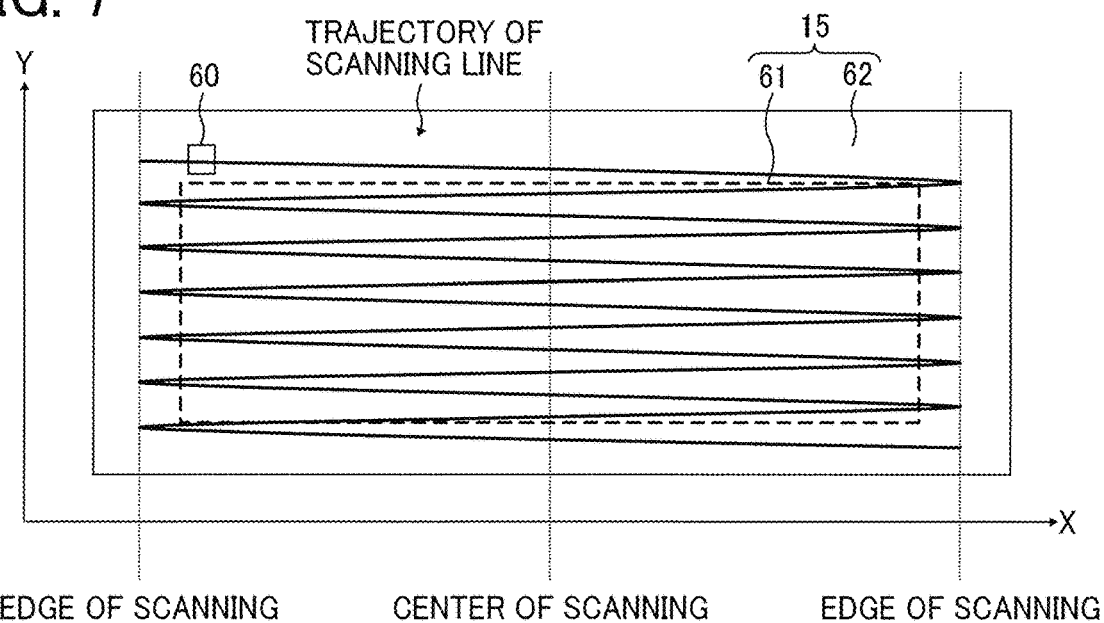
FIG. 7 is a diagram illustrating the trajectory of a scanning line when two-dimensional scanning is performed, according to an embodiment of the present disclosure.

FIG. 7 is a diagram illustrating the trajectory of a scanning line when two-dimensional scanning is performed, according to the present embodiment. As illustrated in FIG. 7, the screen 15 includes an image area 61 (i.e., an effective scanning area) and a frame area 62 that surrounds the image area 61. The image area 61 is irradiated with the light that is modulated according to the image data, and the intermediate image 40 is drawn on the image area 61.

In the present embodiment, the scanning range includes the image area 61 and a part of the frame area 62 (i.e., a portion around the periphery of the image area 61) on the screen 15. In FIG. 7, the trajectory of the scanning line in the scanning range is indicated by a zigzag line. For the sake of explanatory convenience, the number of scanning lines in FIG. 7 is less than the actual number of scanning lines.

For example, the screen 15 may be configured by a transmissive optical element such as a microlens array that diffuses light. In the present embodiment, the shape of the image area 61 is rectangular or planar. However, no limitation is intended thereby, and the shape of the image area 61 may be polygonal or curved. Alternatively, in some embodiments, the screen 15 may be a flat plate or curved plate that does not diffuse light. Further, in some embodiments, the image area 61 may be a reflective element such as a micromirror array that diffuses light, depending on the design or layout of the display device 10.

The screen 15 is provided with a synchronous detection system 60 that includes a light receiver disposed at the edges of the image area 61 (a portion of the frame area 62) in the scanning range. In FIG. 7, the synchronous detection system 60 is disposed on the −X and +Y side of the image area 61. More specifically, the synchronous detection system 60 is disposed at a corner on the +Y side. The synchronous detection system 60 detects the operation of the light deflector 13 and outputs, to the FPGA 1001, a synchronizing signal that determines the start timing of scanning or the end timing of scanning.

First Embodiment

A configuration of the display system 1A according to the first embodiment of the present disclosure is described below with reference to FIG. 8 to FIG. 21B. Firstly, a schematic configuration the display system 1A according to the first embodiment of the present disclosure is described below with reference to FIG. 8 to FIG. 11.

Figure 8:
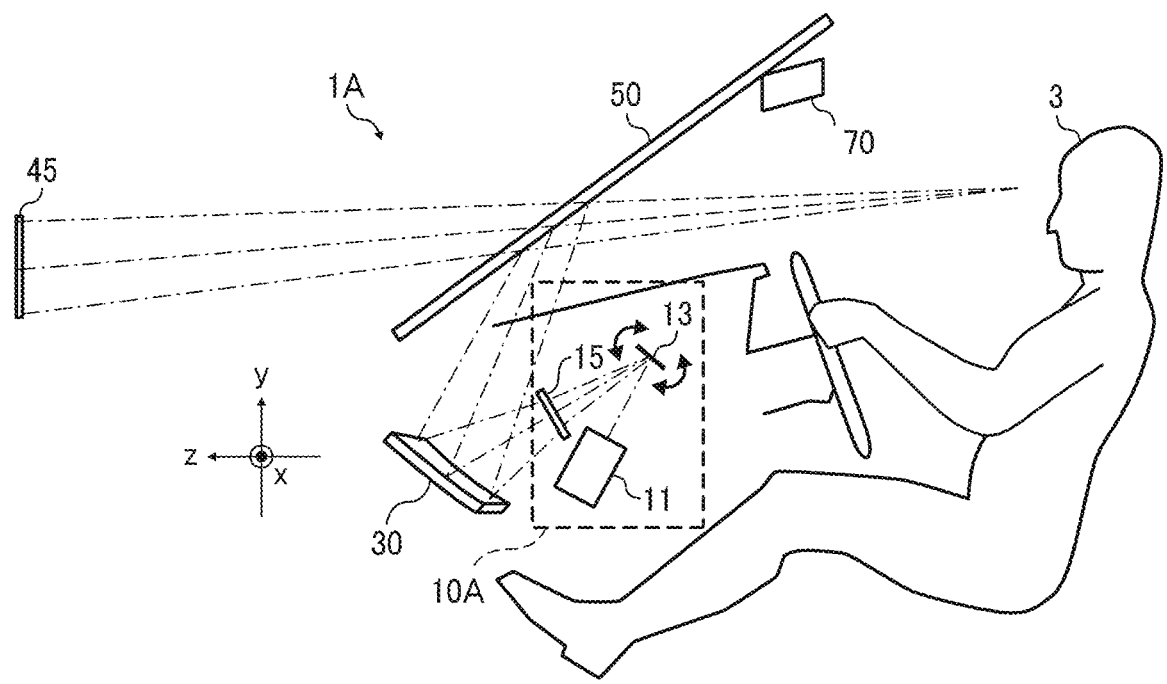
FIG. 8 is a diagram illustrating a schematic configuration of a display system according to a first embodiment of the present disclosure.

FIG. 8 is a diagram illustrating a schematic configuration of the display system 1A according to the first embodiment of the present disclosure.

In the display system 1A as illustrated in FIG. 8, undesired changes in display brightness for the viewer 3, which are caused by abrupt changes in brightness of background, are prevented. Accordingly, the visibility of the display data (i.e., the virtual image 45) can be improved.

In addition to the configuration of the display system 1 as illustrated in FIG. 1, the display system 1A further includes a brightness sensor 70. The brightness sensor 70 is a sensing device disposed to detect the brightness (illuminance) on the road surface ahead of the vehicle for which the display system 1A is provided. As illustrated in FIG. 8, for example, the brightness sensor 70 is disposed on an upper side of the front windshield 50 of a vehicle.

Figure 9:
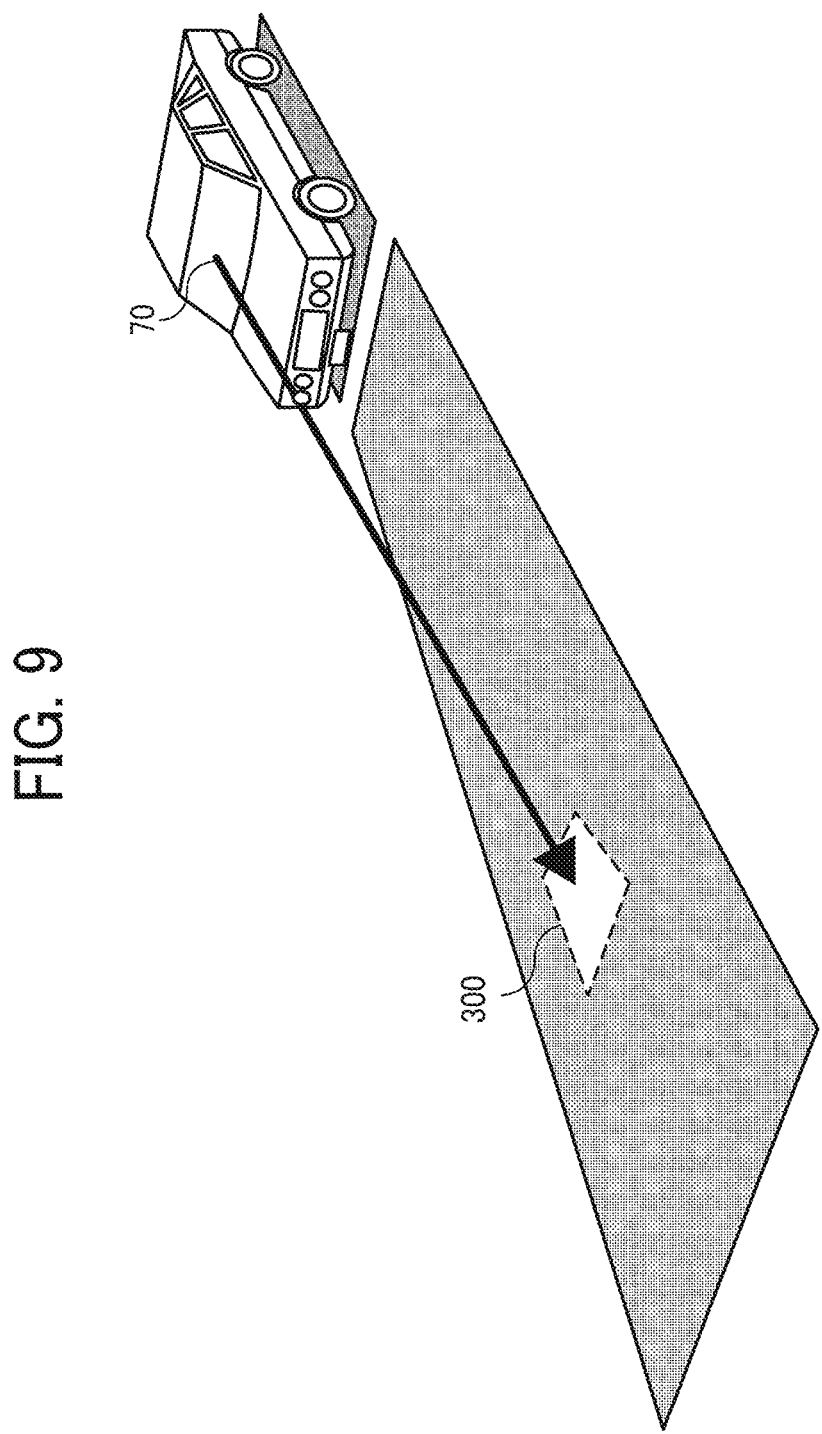
FIG. 9 is a schematic diagram illustrating a brightness detection field in a display system according to the first embodiment of the present disclosure.

For example, the brightness sensor 70 may be a single photoelectric conversion element, a two-dimensional array sensor, or an image sensor such as an on-vehicle camera. As illustrated in FIG. 9, the brightness sensor 70 is disposed at a position from which the brightness (illuminance) of an area (the brightness detection field 300) including the road surface in the area in front of a vehicle is detectable.

Note that the installed position of the brightness sensor 70 is not limited to the example case as illustrated in FIG. 8. For example, the brightness sensor 70 may be disposed above the dashboard of a vehicle. Alternatively, the brightness sensor 70 may be substituted by an illuminance sensor disposed in order to implement an automatic lighting function of a vehicle, or a rain sensor that is disposed to activate the windshield wipers of the vehicle in response to a raindrop. In the present embodiment, cases in which the brightness sensor 70 is separately arranged from the display device 10A are described. However, no limitation is indicated thereby, and the brightness sensor 70 may be built into the display device 10A.

FIG. 10a is a diagram illustrating the relation between a brightness detection field 300 and the background display area 350 in the display system according to the first embodiment of the present disclosure.

Figure 10:
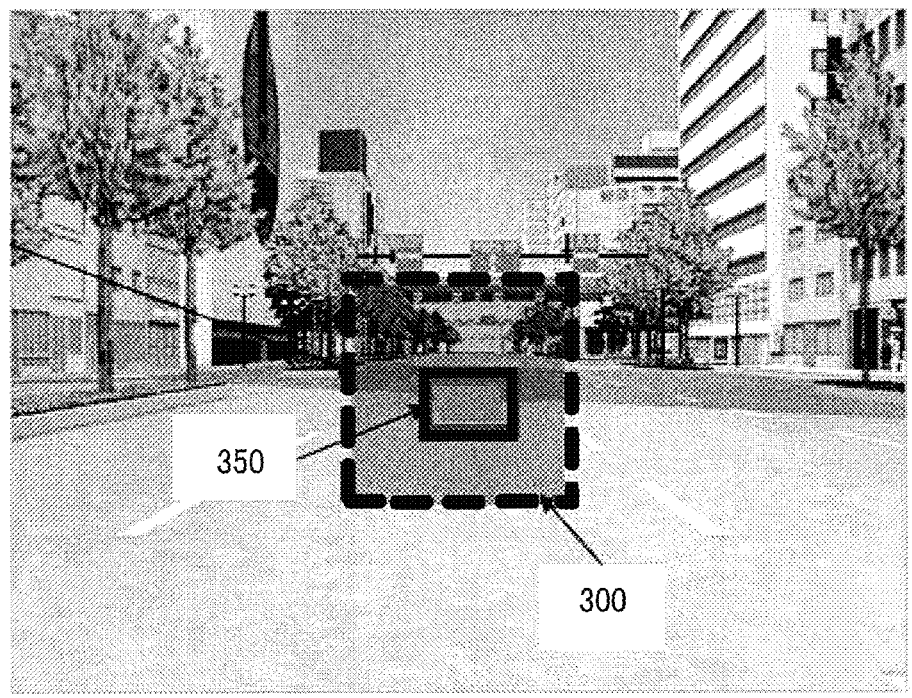
FIG. 10 is a schematic diagram illustrating the relation between a brightness detection field and a background display area in a display system according to the first embodiment of the present disclosure.

The image in FIG. 10 is a scenery image ahead of the vehicle, which the driver (i.e., the viewer 3) of a vehicle visually recognizes through the front windshield 50. More specifically, FIG. 10a is a diagram illustrating the relation between the brightness detection field 300 and the background display area 350 on a scenery image that is visually recognized by the viewer 3.

The background display area 350 is an area where the display data (i.e., the virtual image 45) output from the display device 10A is superimposed on the background image (scenery image). In other words, the driver (i.e., the viewer 3) of a vehicle can visually recognize the virtual image 45 within range of the background display area 350. The background display area 350 includes the display data displayed by the display device 10A, and the road surface in the area in front of the vehicle, which serves as the background image of the display data. Note that the background image of the display data is not limited to the road surface, but may be the scenery around the vehicle such as the exterior walls of a building existing in the area in front of the vehicle, a road sign, and the sky.

The brightness detection field 300 includes the background display area 350 as well as the scenery such as the road surface around the background display area 350, the exterior walls of a building, a road sign, or the sky. In the present embodiment, the brightness detection field 300 includes at least a cross section of the space in which the viewer 3 visually recognizes the display data displayed by the display device 10A.

The display device 10A samples the brightness around the vehicle provided with the display device 10A to monitor changes in brightness in the background display area 350 on which the display data is superimposed. The brightness detection field 300 is an example of a peripheral area. The background display area 350 is an example of a display area.

The brightness detection field 300 as illustrated in FIG. 10 contains the background display area 350. Moreover, the brightness detection field 300 also includes the area outside the area of the background display area 350. As no display data is to be superimposed on the area outside the area of the background display area 350, changes in brightness are not to be sampled from the area outside the area of the background display area 350 under ordinary circumstances.

In the area within the brightness detection field 300 but outside the background display area 350, for example, there may be some cases in which changes in brightness at relatively short intervals (such changes in brightness may be referred to as periodic noise in the following description) occur due to, for example, blink of a direction indicator of a preceding vehicle. In such cases, when the display brightness of the display data is determined based on the brightness data detected in the brightness detection field 300, the display brightness of the display data (i.e., the virtual image 45) changes despite the fact that the brightness of the background within range of the background display area 350 is constant. Such changes in display brightness that are not consistent with changes in the brightness of the background of the background display area 350 cause the viewer 3 to feel awkward, and may end up degrading the visibility of the display data.

In order to handle such a situation, the display system 1A according to the first embodiment of the present disclosure, the display brightness of the display data is purposefully made not to follow the periodic noise caused by the brightness detected in the brightness detection field 300. Due to this configuration, unpleasant changes in brightness for the viewer 3 can be reduced, and the visibility of the display data can be improved.

Figure 11:
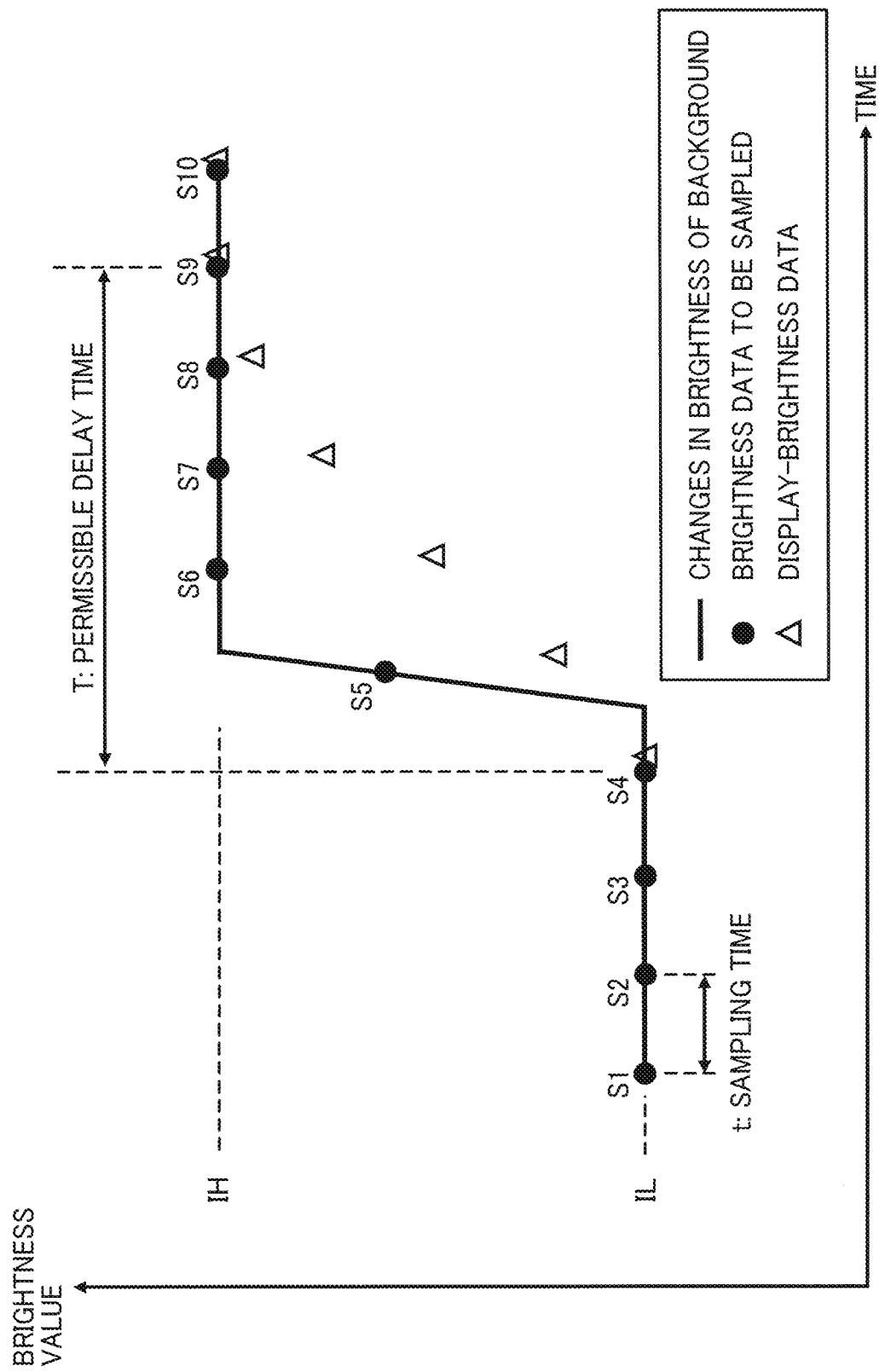
FIG. 11 is a schematic diagram illustrating how to determine the display-brightness data in a display device according to the first embodiment.

FIG. 11 is a schematic diagram illustrating how to determine the display-brightness data 500 in the display device 10 according to the first embodiment.

In FIG. 11, changes in the brightness of the background ahead of a vehicle provided with the display device 10A (the solid line illustrated in FIG. 11), the brightness data (as indicated by the black dots in FIG. 11) sampled by the brightness sensor 70 and the display-brightness data 500 (as indicated by the triangles in FIG. 11) that indicates the display brightness of the display data determined by the display device 10A are illustrated.

As illustrated in FIG. 11, the brightness of the background in the area in front of a vehicle initially takes a relatively low brightness value (IL). However, the value of the brightness of the background in the area in front of the vehicle abruptly changes to a high brightness value (IH) at some midpoint. For example, when light of relatively high brightness such as the sunlight and the headlight of a vehicle travelling from the opposite direction gets into the area in front of the vehicle, the display device 10A detects abrupt changes in the brightness of the background as illustrated in FIG. 11.

The brightness sensor 70 samples the brightness data indicating the brightness in the brightness detection field 300 at prescribed sampling intervals. In the example case as illustrated in FIG. 11, the brightness sensor 70 samples the brightness data (steps S1 to S10) at prescribed sampling intervals (sampling time t).

When the display brightness is changed to follow the brightness data sampled by the brightness sensor 70 without any time lag, the display brightness also follows abrupt changes in brightness as indicated by the S4 to S6 of FIG. 11. Due to this configuration, the viewer 3 feels awkward about the display, and the visibility of the display data deteriorates. On the other hand, also when the length of time it takes for the display brightness to follow the changes in brightness of background is made long, the viewer 3 feels that the display is delayed, and the visibility of the display data deteriorates.

In order to handle such a situation, the display device 10A is configured such that changes to be made to the display brightness are adequately delayed from the changes in brightness of background, while making the display brightness to follow abrupt changes in brightness of background. Due to this configuration, the display brightness can be changed while reducing the awkwardness the viewer 3 might feel.

As illustrated in FIG. 11, in the display device 10A, the display-brightness data 500 is determined based on the sampled brightness data. For example, in the display device 10A, the display-brightness data 500 is determined using an average value obtained from the sampled brightness data. In so doing, in the display device 10A, at least one item of the brightness data used to calculate the average value is changed in a gradual manner. For example, the display-brightness data 500 that is determined when the brightness data of sampling number S4 as illustrated in FIG. 11 is sampled is the average value of the brightness data of sampling numbers S1 to S4. In a similar manner, the display-brightness data 500 that is determined when the brightness data of sampling number S5 as illustrated in FIG. 11 is sampled is the average value of the brightness data of sampling numbers S2 to S5. Further, the display-brightness data 500 that is determined when the brightness data of sampling number S9 as illustrated in FIG. 11 is sampled is the average value of the brightness data of sampling numbers S6 to S9. The display-brightness data 500 that is determined when the brightness data of sampling number S9 is sampled takes a value equivalent to the brightness value IH of the brightness of the background.

As described above, in the display device 10A, the display-brightness data 500 is determined using an average value obtained from the brightness data sampled by the brightness sensor 70. Due to this configuration, in the display device 10A, changes in display brightness in response to the changes in brightness of background are made smooth such that the awkwardness the viewer 3 might feel in response to the changes made in display brightness can be reduced.

In the display device 10A, the length of time it takes for the display brightness to follow the brightness value (IH) of the brightness of the background that has abruptly changed is set to be equal to or shorter than permissible delay time T. The permissible delay time T indicates a permissible range set for the length of delay time it takes before the display brightness is made to follow the brightness of the background, and the viewer 3 does not feel awkward when the delay time is within that permissible range. The display device 10A stores the permissible delay time data 90 that indicates the permissible delay time T in advance as a set value. When it is assumed in the present embodiment that t denotes the sampling time of the brightness data (sampling interval) and n denotes the number of times the delay consideration processes are performed, the number of times "n" the delay consideration processes are performed is determined in the display device 10A so as to satisfy the condition in the first equation given below. Note also that the sampling time t is a predetermined constant value.

$$nt < T \qquad \text{First Equation}$$

In the present embodiment, delay time equal to or shorter than the permissible delay time T is set, and the number of times "n" the delay consideration processes are performed indicates the number of times the delay consideration processes in which the display brightness is made to follow the brightness of the background are to be performed. For example, the number of times "n" the delay consideration processes are performed may be equal to the number of times the brightness data is sampled by the brightness sensor 70 (i.e., the number of times sampling is to be performed). In so doing, in the display device 10A, the number of times sampling is to be performed that corresponds to the sampling time of the brightness data (sampling interval) t is determined so as to satisfy the condition in the above first equation. Note also that the number of times "n" the delay consideration processes are performed may be smaller than the number of times brightness data is to be sampled.

As indicated in the above first equation, in the display device 10A, the number of times "n" the delay consideration processes are performed is determined so as to be equal to or less than T/t. More specifically, for example, T/t=5.6 when the permissible delay time T=1400 milliseconds (msec) and the sampling time t=250 msec. Accordingly, in the display device 10A, the number of times "n" the delay consideration processes are performed is set (determined) to be equal to or smaller than five, and the delay consideration processes are performed five times or less (for example, five times). In so doing, for example, the display device 10A determines the display-brightness data 500 such that the display brightness has a brightness value corresponding to the brightness value [cd/m$^2$] of the [current] brightness of the background at the delay consideration processes for the fifth time.

As described above, in the display device 10A, while making the display brightness to follow abrupt changes in brightness of background changes in display brightness in response to the changes in brightness of background are delayed within the permissible delay time T. Due to this configuration, in the display device 10A, As undesired changes in display brightness for the viewer 3, which are caused by abrupt changes in brightness of background, is controlled, the visibility of the display data can be improved.

Hardware Configuration

Figure 12:
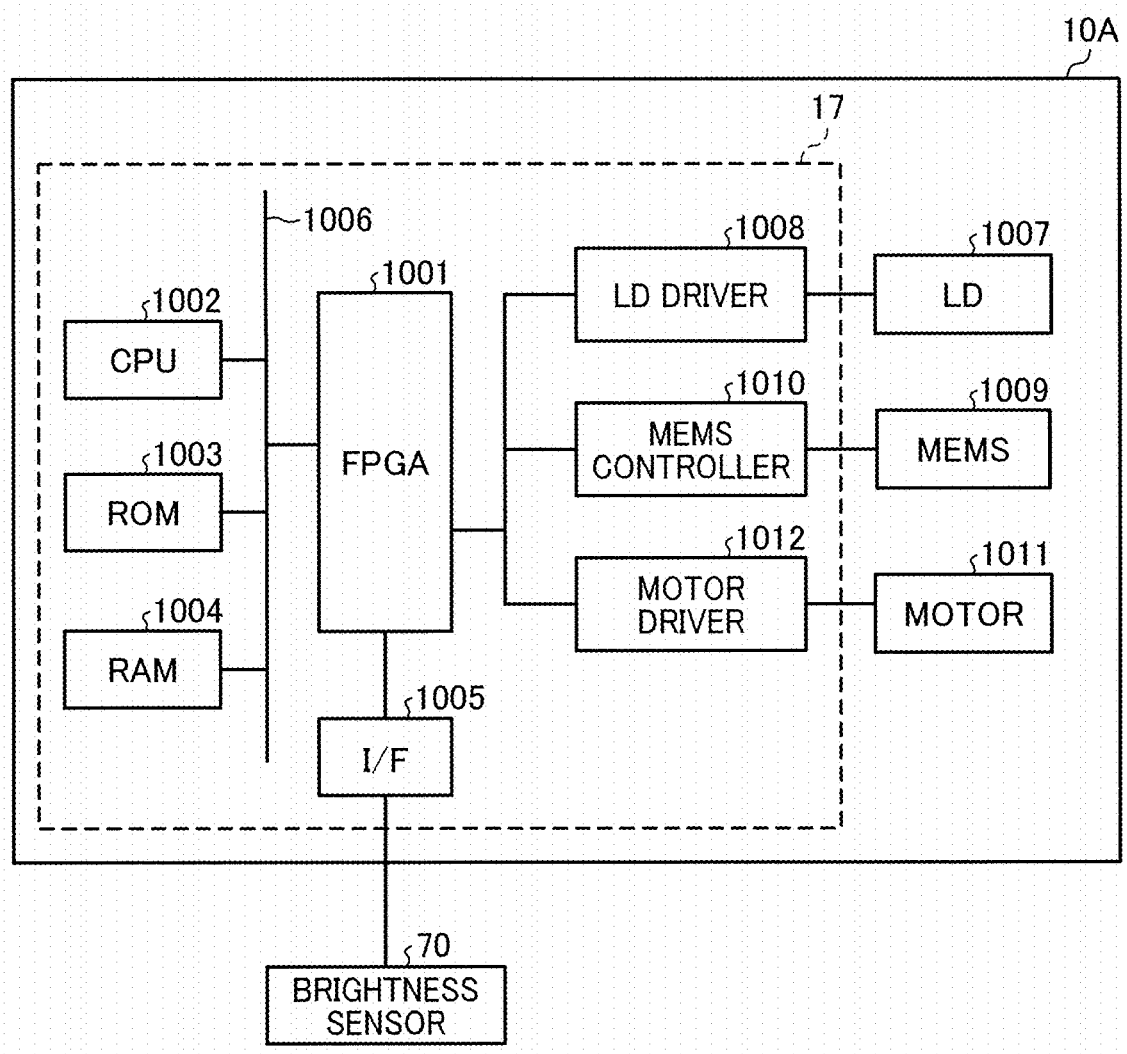
FIG. 12 is a diagram illustrating a hardware configuration of a display device according to the first embodiment of the present disclosure.

FIG. 12 is a diagram illustrating a hardware configuration of a display device according to the first embodiment of the present disclosure.

The hardware configuration illustrated in FIG. 12 may be adopted in common among the embodiments of the present disclosure. Alternatively, some components or elements may be added to or deleted from the hardware configuration of FIG. 12.

The display device 10A includes a controller 17 that controls the operation of the display device 10A. For example, the controller 17 is a circuit board or integrated circuit (IC) chip mounted inside the display device 10A. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 10A. The LD driver 1008, the MEMS controller 1010, and the motor driver 1012 generate a driving signal according to the control signal output from the FPGA 1001. The CPU 1002 is an integrated circuit that controls the entirety of the display device 10A. The ROM 1003 is a storage device that stores a program for controlling the CPU 1002. For example, the display device 10A implements the display-brightness control method according to an embodiment of the present disclosure as the CPU 1002 executes a program according to an embodiment of the present disclosure. The RAM 1004 is a storage device that serves as a work area of the CPU 1002.

The interface 1005 communicates with an external device. For example, the interface 1005 is coupled to the controller area network (CAN) of a vehicle. Moreover, the interface 1005 is coupled to the brightness sensor 70. The brightness sensor 70 sends the sensing data (brightness data) to the controller 17 through the interface 1005.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. The motor 1011 is an electric motor that rotates the rotation axis of the free-form surface mirror 30. The motor driver 1012 is a circuit that generates a driving signal for driving the motor 1011.

Functional Configuration

Figure 13:
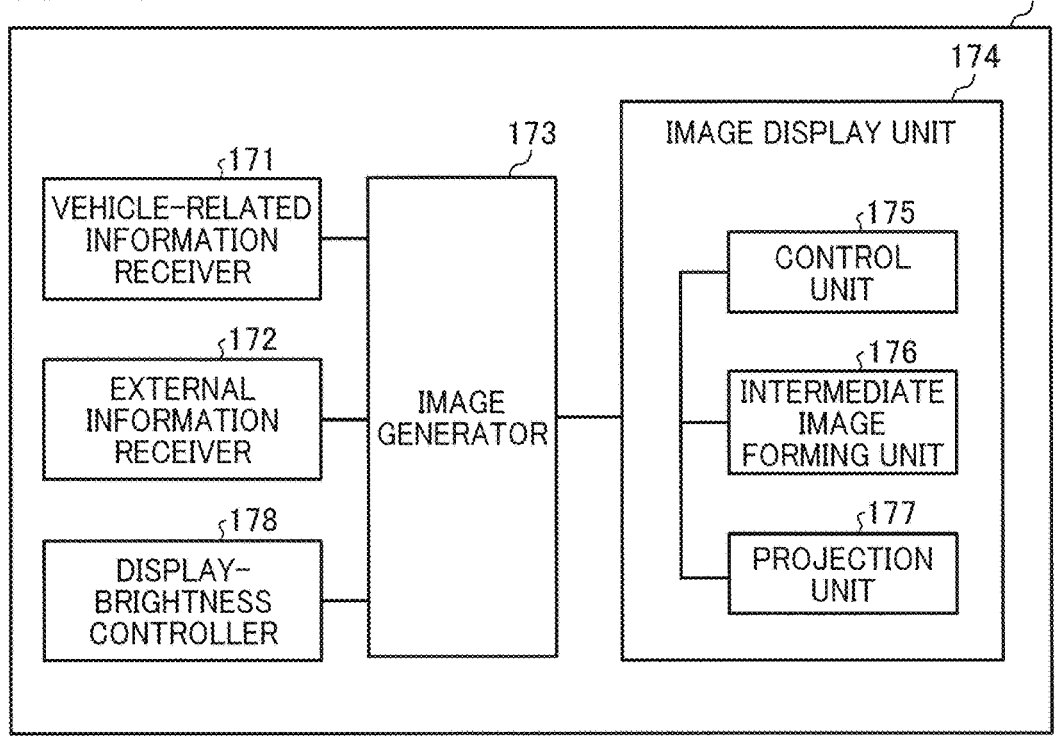
FIG. 13 is a diagram illustrating a functional configuration of a display device according to the first embodiment of the present disclosure.

FIG. 13 is a diagram illustrating a functional configuration the display device 10 according to the first embodiment of the present disclosure.

The functions that are implemented by the display device 10A include a vehicle-related information receiver 171, an external information receiver 172, a display-brightness controller 178, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 12. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented by some of the elements illustrated in FIG. 12. In particular, the external information receiver 172 may be implemented by the interface 1005, the processing performed by the CPU 1002, and a program stored in the ROM 1003.

The display-brightness controller 178 is a function to control the display brightness of the display data output from the display device 10A. For example, the display-brightness controller 178 is implemented by some of the elements illustrated in FIG. 12. In particular, the display-brightness controller 178 may be implemented by the interface 1005, the processing performed by the CPU 1002, and a program stored in the ROM 1003. A configuration of the display-brightness controller 178 will be described later in detail.

The image generator 173 is a function to generate display data (image data), which is used to display the intermediate image 40 and the virtual image 45, based on the data input from the vehicle-related information receiver 171, the external information receiver 172, and the display-brightness controller 178. For example, the image generator 173 is implemented by some of the elements illustrated in FIG. 12. In particular, the image generator 173 may be implemented by the processing performed by the CPU 1002, and a program stored in the ROM 1003.

The image display unit 174 is a function to form the intermediate image 40 on the screen 15 based on the image data generated by the image generator 173, and to project the laser beams (bundle of laser beams) that form the intermediate image 40 towards the front windshield 50 to display the virtual image 45. For example, the image display unit 174 is implemented by some of the elements illustrated in FIG. 12. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form the intermediate image 40, the control unit 175 generates a control signal used to control the operation of the light-source device 11 and the light deflector 13. Moreover, the control unit 175 generates a control signal that controls the operation of the free-form surface mirror 30 to display the virtual image 45 at a desired position.

The intermediate image forming unit 176 forms the intermediate image 40 on the screen 15 based on the control signal generated by the control unit 175. The projection unit 177 projects the laser beams that form the intermediate image 40 towards the transmissive reflector (e.g., the front windshield 50) in order to form the virtual image 45 to be visually recognized by the viewer 3.

A functional configuration of the display-brightness controller 178 is described below in detail.

Figure 14:
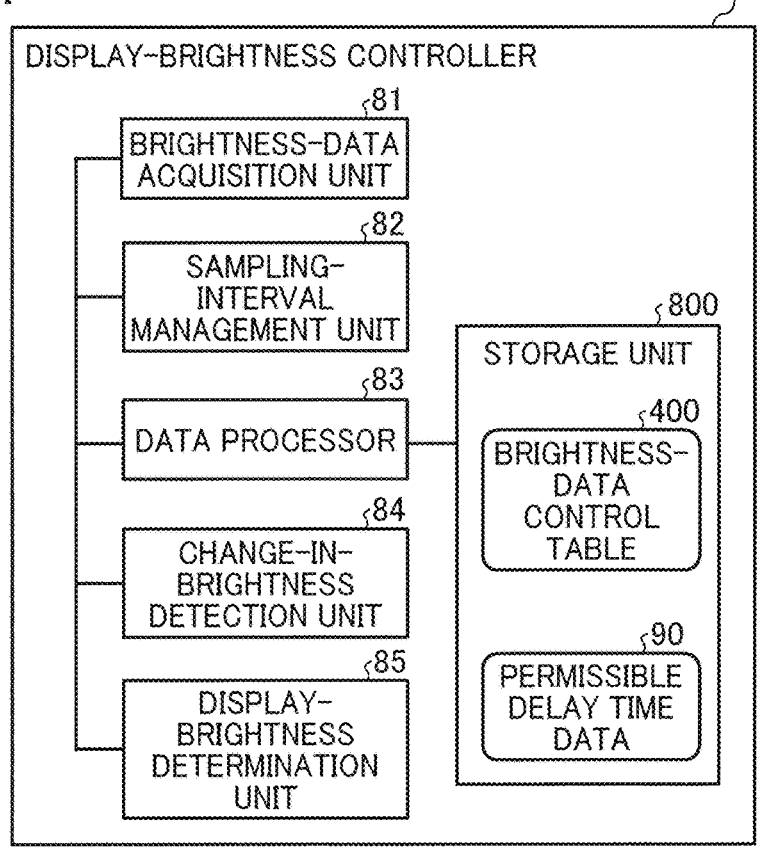
FIG. 14 is a diagram illustrating a detailed functional configuration of a display-brightness controller according to the first embodiment of the present disclosure.

FIG. 14 is a diagram illustrating a detailed functional configuration of the display-brightness controller 178 according to the first embodiment of the present disclosure.

The display-brightness controller 178 includes a brightness-data acquisition unit 81, a sampling-interval management unit 82, a data processor 83, a change-in-brightness detection unit 84, a display-brightness determination unit 85, and a storage unit 800.

The brightness-data acquisition unit 81 is a function to obtain from the brightness sensor 70 the brightness data 450 including the brightness data detected by the brightness sensor 70. The brightness data detected by the brightness sensor 70 indicates the brightness value (illuminance value) in the brightness detection field 300. The brightness-data acquisition unit 81 obtains the brightness data 450 at predetermined sampling intervals (sampling time t). The brightness-data acquisition unit 81 is an example of an acquisition unit.

The sampling-interval management unit 82 is a function to manage the sampling intervals at which the brightness sensor 70 detects the brightness data. The sampling intervals (sampling time t) is determined in advance as a design value. The brightness-data acquisition unit 81 obtains from the brightness sensor 70 the brightness data 450 including the brightness data, which is detected based on the set sampling intervals.

Preferably, the sampling interval is shorter than the cycle of periodic noise caused in the brightness of the background. For example, the cycle of periodic noise that is caused in the brightness of the background is the blinking cycle of a direction indicator of a car. Alternatively, the cycle of periodic noise that is caused in the brightness of the background may be, for example, the cycle of the blinking of a light placed on a road shoulder and the cycle of the operation of the windshield wipers of the vehicle. The periodic noise is not limited to the examples given as above, and may be any abrupt changes in brightness that occur at relatively short intervals and are detected by the brightness sensor 70. The brightness sensor 70 can detect unwanted changes in brightness for the viewer 3 by sampling brightness data at intervals shorter than the cycle of such periodic noise. The brightness-data acquisition unit 81 obtains from the brightness sensor 70 the brightness data 450 including the brightness data detected based on the set sampling intervals.

The data processor 83 is a function to perform processing to store various types of data in the storage unit 800 or read various types of data stored in the storage unit 800. The data processor 83 is a function to cause the brightness-data control table 400 stored in the storage unit 800 to store the brightness data 450 obtained by the brightness-data acquisition unit 81. The data processor 83 is an example of a storage control unit. The storage unit 800 stores the brightness-data control table 400 and permissible delay time data 90. The details of the brightness-data control table 400 and the permissible delay time data 90 are described later.

The change-in-brightness detection unit 84 is a function to detect changes in brightness of background. For example, the change-in-brightness detection unit 84 compares the brightness value indicated by the brightness data 450 obtained by the brightness-data acquisition unit 81 with the brightness value indicated by the brightness data 450 stored in the brightness-data control table 400, and detects changes in the brightness of the background when a difference whose value is equal to or greater than a predetermined value is detected. When changes in the brightness of the background are detected, the change-in-brightness detection unit 84 determines whether the brightness of the background has increased or the brightness of the background has decreased. A predetermined value that is used to detect changes in brightness is stored in advance as a set value in the display device 10A. For example, such a predetermined value that is used to detect changes in brightness is set such that abrupt changes in brightness of background that are caused by, for example, the sunlight and the headlight of a vehicle travelling from the opposite direction are detectable. The change-in-brightness detection unit 84 is an example of a detection unit.

The display-brightness determination unit 85 is a function to determine the display brightness of the display data output from the display device 10A. The display-brightness determination unit 85. For example, when changes in the brightness of the background are detected by the change-in-brightness detection unit 84, the display-brightness data 500 that indicates the display brightness of the display data is determined such that the length of delay time it takes before the display brightness is made to correspond to the brightness of the background is equal to or shorter than the permissible delay time T.

More specifically, the display-brightness determination unit 85 determines the number of times the delay consideration processes are to be performed on the brightness data 450 based on a sampling interval (sampling time t), such that the display brightness takes a value equivalent to the brightness value of the brightness of the background within the permissible delay time T. For example, the display-brightness determination unit 85 determines the display-brightness data 500 that indicates the display brightness of the display data (i.e., the virtual image 45), based on a representative value of the brightness data 450 stored in the brightness-data control table 400. The representative values of the brightness data 450 is a value that serves as a scale, indicating a feature or tendency of the brightness data 450 stored in the brightness-data control table 400. For example, the representative values of the brightness data 450 is an average value or median value of the brightness data 450 stored in the brightness-data control table 400. The display-brightness determination unit 85 is an example of a determination unit.

Brightness-Data Control Table

A brightness-data control table stored in the storage unit 800 is described below in detail with reference to FIG. 15.

Figure 15:
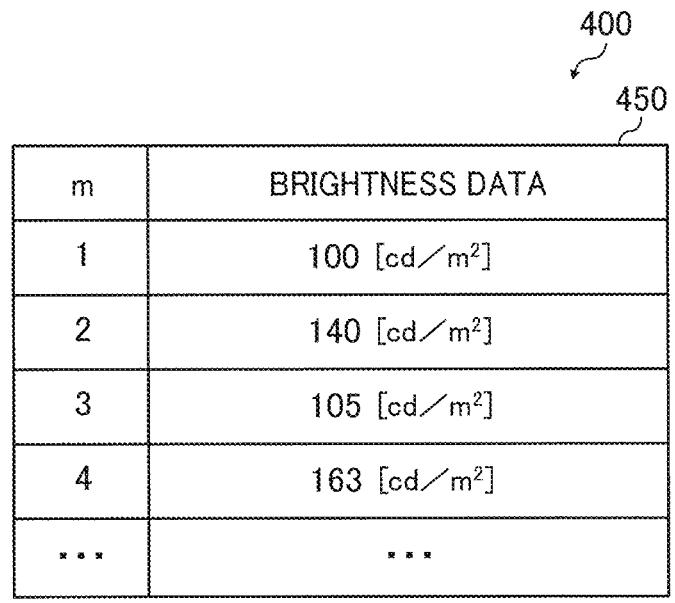
FIG. 15 is a diagram illustrating a brightness-data control table according to the first embodiment of the present disclosure.

FIG. 15 is a diagram illustrating a brightness-data control table according to the first embodiment of the present disclosure.

The brightness-data control table 400 is a buffer area having a fixed size sufficient to store the brightness data 450 obtained by the brightness-data acquisition unit 81. The brightness-data control table 400 is an example of a storage area.

The brightness data 450 that is obtained by the brightness-data acquisition unit 81 is stored in the brightness-data control table 400 in chronological order. The data processor 83 stores the obtained brightness data 450 in the brightness-data control table 400 as illustrated in FIG. 15 in the order from the area of sampling number (m) "1."

As the size of the brightness-data control table 400 is limited, no free space is available when the sampling number (m) reaches the upper limit. For this reason, when it is determined that no free space is available in the brightness-data control table 400, the data processor 83 deletes the oldest brightness data 450. In other words, the data processor 83 deletes the brightness data 450 stored in the area of sampling number (m) "1" of the brightness-data control table 400, and pushes up the sampling number (m) of the brightness data 450 stored in the areas of sampling number (m) "2" and the following sampling numbers (m) one by one.

Then, the data processor 83 stores the newly obtained brightness data 450 in the last row of the brightness-data control table 400 having the largest sampling number (m). For example, when the upper limit of the sampling number (m) in the brightness-data control table 400 is "4," the data processor 83 stores the newly obtained brightness data 450 in the area of sampling number (m) "4."

In FIG. 15, an example case in which the brightness data 450 in the brightness-data control table 400 includes brightness values [cd/m$^2$] is described as above. However, no limitation is indicated thereby, and the brightness data 450 may include illuminance values [lux (lx)]. In so doing, in the display device 10A, the brightness data 450 including the illuminance values (lx) (illuminance data) detected by the brightness sensor 70 in the brightness detection field 300 is obtained, and the obtained brightness data 450 is stored in the brightness-data control table 400.

Permissible Delay Time

The permissible delay time data 90 stored in the storage unit 800 is described below in detail with reference to FIG. 16.

Figure 16:
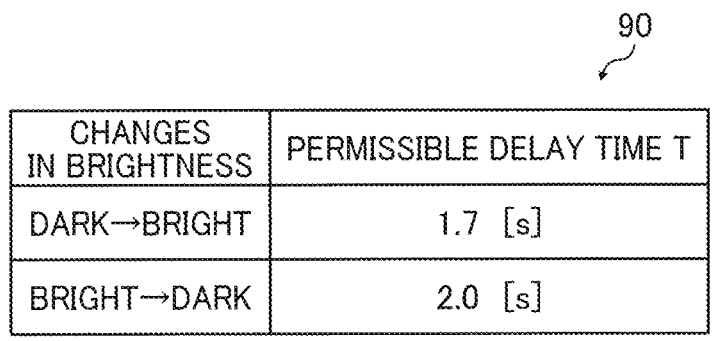
FIG. 16 is a diagram illustrating permissible delay time data according to the first embodiment of the present disclosure.

FIG. 16 is a diagram illustrating the permissible delay time data 90 according to the first embodiment of the present disclosure.

The permissible delay time data 90 is the data that includes the permissible delay time T that is set as a permissible range of the length of delay time it takes before the display brightness is made to follow the brightness of the background, and the viewer 3 does not feel awkward when the delay time is within that permissible range.

The permissible delay time data 90 includes permissible delay times T that differ depending on how the brightness of the background changes. More specifically, the permissible delay time data 90 includes two different permissible delay times T that are adapted to a case in which the brightness value of the brightness of the background increases (changes from a dark condition to a bright condition) and another case in which the brightness value of the brightness of the background decreases (changes from a bright condition to a dark condition).

For example, the permissible delay time T that corresponds to a case in which the brightness value of the brightness of the background increases (changes from a dark condition to a bright condition) is 1.7 seconds (sec). On the other hand, the permissible delay time T that corresponds to a case in which the brightness value of the brightness of the background decreases (changes from a bright condition to a dark condition) is 2.0 sec.

For example, in statistics on the sensory evaluation of the viewer 3 who visually recognizes the display data, the permissible delay time T is set within the range in which the delay time where 80% of the viewers 3 do not feel awkward about the changes in display brightness. In the display device 10A, the display brightness is changed such that the display brightness a value equivalent to the brightness value of the brightness of the background, within the length of time indicated by the permissible delay time T included in the permissible delay time data 90. Due to this configuration, the visibility of the display data can be improved while reducing the awkwardness the viewer 3 might feel.

In the display device 10A, different permissible delay times T are used depending on how the brightness of the background changes (for example, changes from a dark condition to a bright condition and changes from a bright condition to a dark condition). Due to this configuration, the length of delay time it takes to change the display brightness can be changed depending on how the brightness of the background changes. However, no limitation is intended thereby, and the value of the permissible delay time T included in the permissible delay time data 90 may be adjusted as desired by, for example, the designer of the display device 10A. Alternatively, the permissible delay time data 90 may include only one permissible delay time T regardless of how the brightness of the background changes.

Display Brightness Controlling Process

The controlling processes of the display brightness of the display data (i.e., the virtual image 45) in the display device 10A are described below with reference to FIG. 17A and FIG. 17B.

Figure 17A:
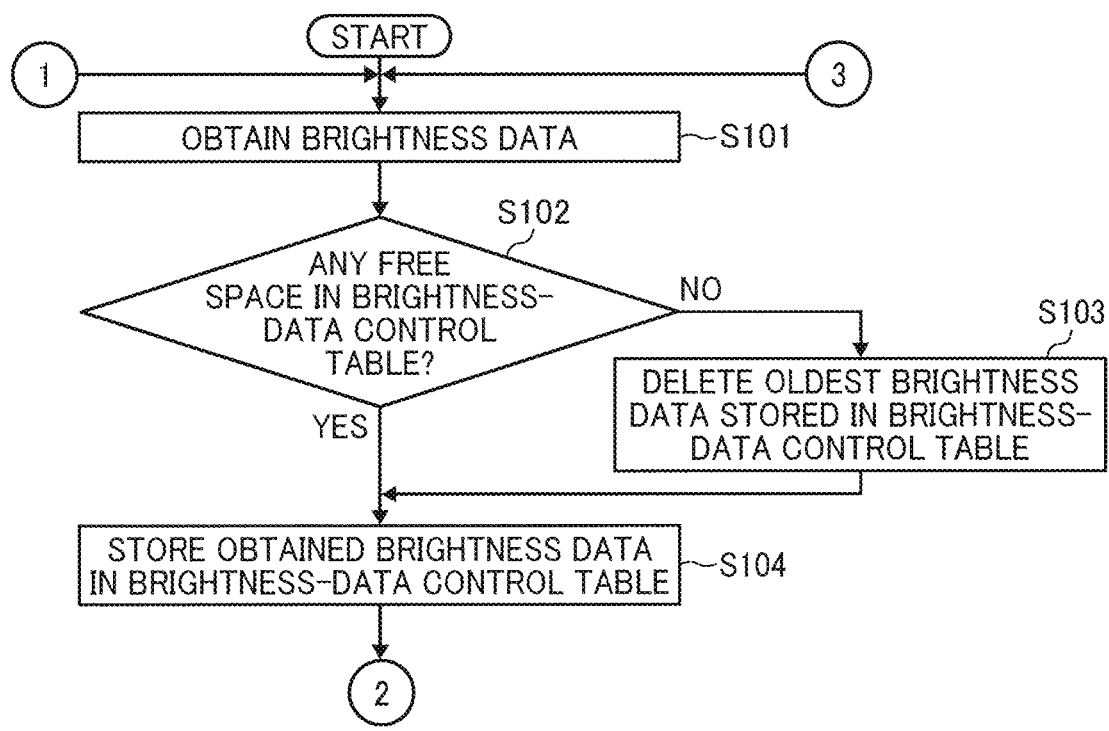
FIG. 17A and FIG. 17B are a first flowchart of how the display brightness is controlled in a display device according to the first embodiment of the present disclosure.
Figure 17B:
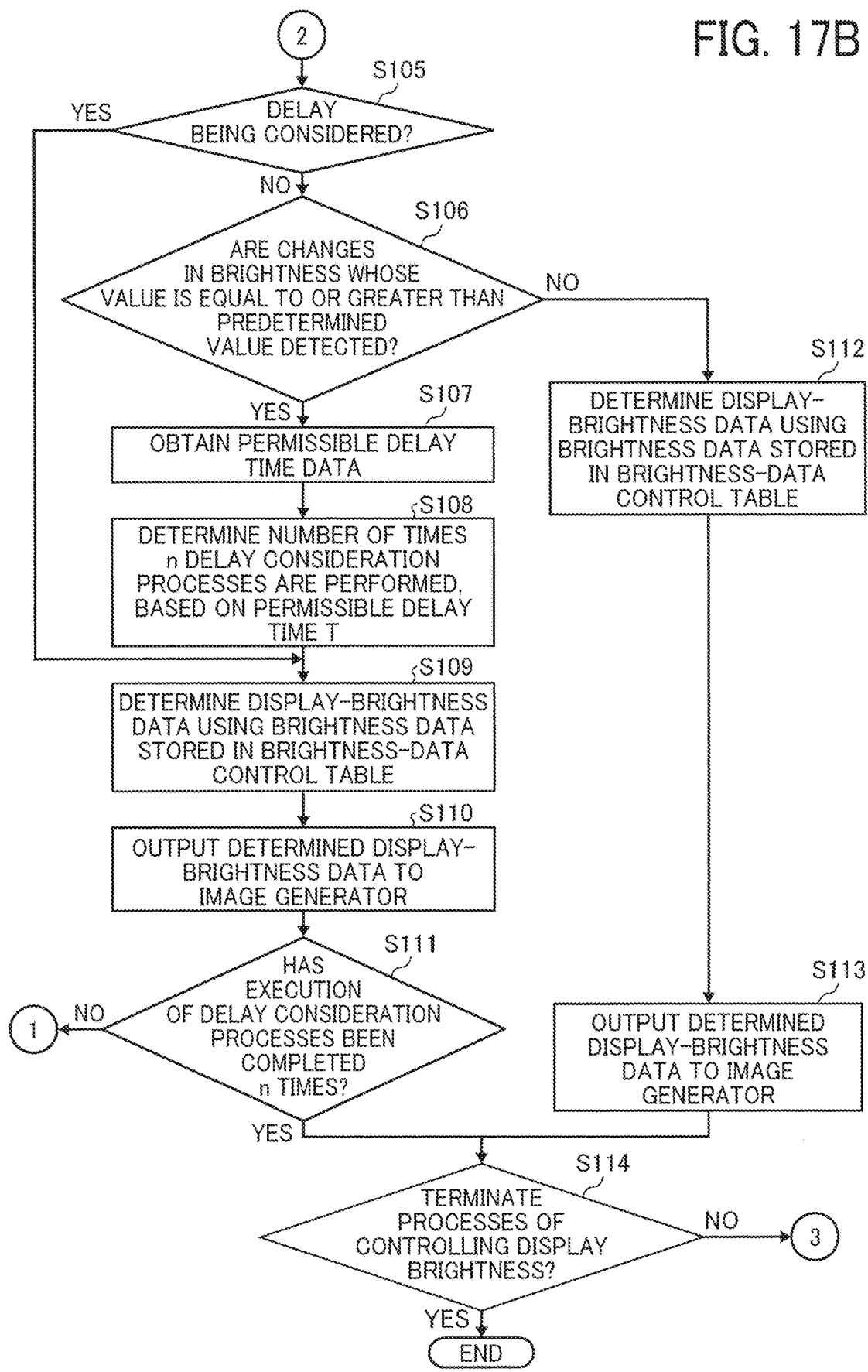

FIG. 17A and FIG. 17B are a first flowchart of how the display brightness is controlled in the display device 10A according to the first embodiment of the present disclosure.

More specifically, FIG. 17A and FIG. 17B illustrate an example case in which delay consideration processes or smoothing process is executed in the display device 10A. In the delay consideration processes, the length of delay time it takes before the display brightness of the display data is made to follow the brightness of the background is set. In the smoothing process, the effect of the periodic noise of the brightness of the background is reduced.

In a step S101, the brightness-data acquisition unit 81 in the display device 10A obtains the brightness data 450 from the brightness sensor 70 (an example of an obtaining step). More specifically, the brightness sensor 70 detects the brightness data in the brightness detection field 300 at the sampling intervals determined in advance by the sampling-interval management unit 82. The brightness data indicates the brightness value [cd/m$^2$] in the brightness detection field 300. The brightness data may indicate the illuminance value [lx] in the brightness detection field 300. Then, the brightness-data acquisition unit 81 obtains from the brightness sensor 70 the brightness data 450 including the brightness data detected by the brightness sensor 70.

Note also that the sampling intervals at which the brightness sensor 70 detects the brightness data does not necessarily match the intervals at which the brightness-data acquisition unit 81 obtains the brightness data 450. In such a configuration where the sampling intervals at which the brightness sensor 70 detects the brightness data does not match the intervals at which the brightness-data acquisition unit 81 obtains the brightness data 450, for example, a buffer that temporarily stores the brightness data detected by the brightness sensor 70 may be provided and the brightness sensor 70 stores (updates) the brightness data that is detected at every sampling interval in the buffer. Moreover, the brightness-data acquisition unit 81 may obtain the brightness data 450, including the brightness data stored in the buffer, at intervals different from the sampling intervals. By way of example, the brightness sensor 70 may detect the brightness data at 200-millisecond intervals, and the brightness-data acquisition unit 81 may obtain the brightness data 450 including the brightness data stored in the buffer at 150-millisecond intervals.

In a step S102, when free space is available in the brightness-data control table 400, the data processor 83 of the display device 10A shifts the process to a step S104. On the other hand, when no free space is available in the brightness-data control table 400, the data processor 83 shifts the process to a step S103.

As the brightness-data control table 400 is a buffer area having a fixed size, when the stored brightness data 450 reaches an upper limit of the number of times sampling can be performed, the brightness-data control table 400 reaches capacity. Due to this configuration, whether or not the brightness-data control table 400 has free space is determined in the display device 10A to prepare free space in which the brightness data 450 can newly be stored when needed. For example, when the upper limit of the number of times sampling can be performed is four, the brightness data 450 is stored in the brightness-data control table 400 as illustrated in FIG. 15 up to the area of sampling number (m) "4." This means that there is no available free space.

In a step S103, the data processor 83 of the display device 10A deletes the oldest brightness data 450 stored in the brightness-data control table 400. More specifically, for the purposes of preparing free space in the brightness-data control table 400, the data processor 83 deletes the brightness data 450 stored in the area of sampling number (m) "1" of the brightness-data control table 400 as illustrated in FIG. 15. When the brightness data 450 stored in the brightness-data control table 400 is deleted, the data processor 83 shifts the process to a step S104.

In the step S104, the data processor 83 of the display device 10A controls the brightness-data control table 400 to store the brightness data 450 obtained by the brightness-data acquisition unit 81. In so doing, the newly obtained brightness data 450 is stored in the last row of the brightness-data control table 400 in order to clarify the chronological order of the obtained brightness data 450. For example, when the brightness data 450 is stored in the brightness-data control table 400 as illustrated in FIG. 15 up to the area of sampling number (m) "3," the data processor 83 stores the newly obtained brightness data 450 in the area of sampling number (m) "4."

In a step S105, when the delay consideration processes are being performed, the display device 10A shifts the process to a step S109. On the other hand, when the delay consideration processes are not being performed, the display device 10A shifts the process to a step S106.

In the step S106, when changes in the brightness of the background whose value is equal to or greater than a predetermined value are detected based on the brightness value [$cd/m^2$] indicated by the brightness data 450 obtained by the brightness-data acquisition unit 81, the change-in-brightness detection unit 84 in the display device 10A shifts the process to a step S107 (an example of a detecting step). More specifically, when the brightness value [$cd/m^2$] indicated by the brightness data 450 newly obtained by the brightness-data acquisition unit 81 is compared with the brightness value [$cd/m^2$] indicated by the brightness data 450 stored in the brightness-data control table 400 and a difference whose value is equal to or greater than a predetermined value is detected, the change-in-brightness detection unit 84 detects changes in brightness whose value is equal to or greater than a predetermined value. A predetermined value that is used to detect changes in brightness is stored in advance as a set value in the display device 10A. For example, such a predetermined value that is used to detect changes in brightness is set such that abrupt changes in brightness of background that are caused by, for example, the sunlight and the headlight of a vehicle travelling from the opposite direction are detectable.

When changes in the brightness of the background are detected and the value of such detected changes is equal to or greater than a predetermined value, the change-in-brightness detection unit 84 judges the detected changes in brightness. For example, the change-in-brightness detection unit 84 detects an increase in the brightness value [$cd/m^2$] of the brightness of the background (for example, changes in brightness from IL to IH as illustrated in FIG. 11) or a reduction in the brightness value [$cd/m^2$] of the brightness of the background (for example, changes in brightness from IH to IL as illustrated in FIG. 11). Then, the change-in-brightness detection unit 84 outputs the result of determination to the display-brightness determination unit 85.

In a step S107, the display-brightness determination unit 85 in the display device 10A reads the permissible delay time data 90 stored in the storage unit 800. More specifically, the display-brightness determination unit 85 reads the permissible delay time T that is determined by the change-in-brightness detection unit 84 depending on how the brightness changes. When it is determined by the change-in-brightness detection unit 84 that the brightness value of the brightness of the background has increased. For example, the display-brightness determination unit 85 reads the permissible delay time T corresponding to the changes in brightness from a dark condition to a bright condition as illustrated in FIG. 16.

In a step S108, the display-brightness determination unit 85 in the display device 10A determines the number of times the delay consideration processes are to be performed, based on the read permissible delay time T. In the delay consideration processes, delay time equal to or shorter than the permissible delay time T is set, and the display brightness is made to follow the brightness of the background. For example, the number of times the delay consideration processes are to be performed may be equal to the number of times the brightness data is sampled by the brightness sensor 70 (i.e., the number of times sampling is to be performed). In such cases, the number of times brightness data is to be sampled is determined in the display device 10A based on the read permissible delay time T. When it is assumed that "t" denotes the sampling time (sampling interval) and "n" denotes the number of times the delay consideration processes are to be performed, the display-brightness determination unit 85 determines the number of times "n" the delay consideration processes are to be performed, so as to satisfy the condition in the first equation given below.

$$nt<T \qquad \text{First Equation}$$

For example, when T=1400 milliseconds (msec) and the sampling time t=250 msec, T/t=5.6. In such cases, in the display device 10A, the number of times n the delay consideration processes are to be performed is determined to be equal to or less than five times. Due to this configuration, the length of time (i.e., the delay time) it takes for the display brightness to follow the brightness value [cd/m²] of the brightness of the background is made to fall within the permissible delay time T. As described above, when the sampling intervals at which the brightness sensor 70 detects the brightness data is different from the intervals at which the brightness-data acquisition unit 81 obtains the brightness data 450, the sampling time t may indicate the intervals at which the brightness-data acquisition unit 81 obtains the brightness data 450.

In the display device 10A according to the present embodiment, certain length of processing time d may be required to reflect the brightness data detected by the brightness sensor 70 in the display brightness of display data. The processing time d includes, for example, the length of time (i.e., the length of time during which the brightness sensor 70 communicates with the display device 10A) it takes for the brightness-data acquisition unit 81 to obtain the brightness data detected by the brightness sensor 70 as the brightness data 450, the length of time it takes for the display-brightness determination unit 85 to calculate the display-brightness data 500, and the length of time it takes to project the display data (i.e., the virtual image 45) based on the display-brightness data 500.

In such cases, in the display device 10A, the number of times n the delay consideration processes are to be performed may be determined so as to satisfy the condition in the second equation given below. Due to this configuration, in the display device 10A, the delay time is calculated in view of the length of time required to perform internal processing. Accordingly, the precision of the display-brightness controlling processes can be improved.

$$nt+d<T \qquad \text{Second Equation}$$

As described above, the display-brightness determination unit 85 determines the number of times "n" the delay consideration processes are to be performed such that the length of delay time it takes before the display brightness is made to follow the brightness of the background falls within the permissible delay time T. Due to this configuration, in the display device 10A, even when the brightness of the background abruptly changes, natural-looking display where the viewer 3 does not feel awkward can be implemented. Example cases in which the intervals at which the brightness data is sampled (sampling time t) are constant are described as above. However, no limitation is indicated thereby, and the sampling intervals (sampling time t) may be changed. In such cases, in the display device 10A, the number of times "n" the delay consideration processes are performed is determined based on the sampling time t at which the brightness data is sampled so as to satisfy the condition in the first or second equation.

In a step S109, the display-brightness determination unit 85 in the display device 10A determines the display-brightness data 500 using a representative value of the brightness data 450 stored in the brightness-data control table 400 (an example of a determination step). More specifically, the display-brightness determination unit 85 calculates the representative value of the brightness data 450 stored in the brightness-data control table 400. For example, the representative values of the brightness data 450 is an average value or median value of the brightness value [cd/m²] included in the brightness data 450 stored in the brightness-data control table 400.

In the present embodiment, the display-brightness determination unit 85 may determine the display-brightness data 500, using a representative value of the brightness data 450 obtained by performing the delay consideration processes n times from among the items of the brightness data 450 stored in the brightness-data control table 400. The display-brightness determination unit 85 may determine the display-brightness data 500 using all the representative values of the brightness data 450 stored in the brightness-data control table 400. In the display device 10A, changes in display brightness can be made smooth as the number of items of the brightness data 450 used to determine the display-brightness data 500 is greater.

When the brightness data detected by the brightness sensor 70 indicates the illuminance value [lx], the display-brightness determination unit 85 calculates a representative value of the illuminance value [lx] included in the brightness data 450, and converts the obtained value into a brightness value [cd/m²]. For example, the conversion processes from the illuminance value [lx] into the brightness value [cd/m²] may be implemented by integrating a predetermined constant into the illuminance value [lx] obtained as a representative value. When the brightness data detected by the brightness sensor 70 indicates the illuminance value [lx], the display-brightness determination unit 85 may convert the illuminance value [lx] included in the brightness data 450 into a brightness value, and then a representative value of the brightness value obtained by the above conversion may be calculated.

In a step S110, the display-brightness determination unit 85 in the display device 10A outputs the determined display-brightness data 500 to the image generator 173. The image generator 173 applies the value of display brightness indicated by the display-brightness data 500 to the display brightness of the display data (i.e., the virtual image 45). Then, the image display unit 174 controls the display to display the display data using the display brightness indicated by the display-brightness data 500 (an example of a displaying step).

In a step S111, the display device 10A when execution of the delay consideration processes is completed n times as determined by the display-brightness determination unit 85, the process is shifted to a step S114. In the step S114, when the processes of controlling display brightness are to be continued, the display-brightness controller 178 in the display device 10A repeats the processes from the step S101. On the other hand, the display-brightness controller 178 terminates the processes when the processes of controlling display brightness are not to be continued.

In the step S111, in the display device 10A, when the delay consideration processes are being performed n times as determined by the display-brightness determination unit 85, the processes are repeated from the step S101 Then, in the display device 10A, the display brightness is changed in a gradual manner as illustrated in FIG. 11 by repeating the delay consideration processes n times as determined as above, and the display brightness is made to follow the brightness value [cd/m²] of the brightness of the background within the permissible delay time T. Due to this configuration, in the display device 10A, even when abrupt changes in the brightness of the background are detected, the display brightness is changed with appropriate delay. Accordingly, the display brightness can be made to follow the brightness of the background while reducing the awkwardness the viewer 3 might feel.

In regard to the processes in the step S109, an example case in which the display-brightness determination unit 85 calculates a representative value of the brightness data 450 included in the brightness-data control table 400 as the display-brightness data 500 is described as above. However, the value that is calculated as the display-brightness data 500 is not limited to the above example cases. It is satisfactory as long as the display-brightness data 500 is made to follow the brightness value [cd/m²] of the brightness of the background in the delay consideration processes performed for the n-th time. In such a configuration, the display-brightness data 500 in the delay consideration processes performed for the first time to n−1-th time may be adjusted as appropriate such that the brightness value [cd/m²] changes in a gradual manner.

In the display device 10A, the brightness-data control table 400 may be updated as in the steps S101 to S104 as above at the sampling intervals at which the brightness sensor 70 detects the brightness data, and the processes in the step S105 and the following steps may be performed at intervals different from the sampling intervals. In such a configuration, the sampling time t as in the first equation may be the intervals at which the processes in the step S105 and the following steps are performed.

The processes that are performed in the display device 10A when abrupt changes in brightness are not detected are described below. When abrupt changes in the brightness of the background are not detected in the display device 10A, smoothing processes are performed on the brightness data 450 to improve the visibility of the image display data. When changes in brightness whose value is equal to or greater than a predetermined value are not detected in the step S106 based on the brightness value [cd/m²] indicated by the brightness data 450 obtained by the brightness-data acquisition unit 81, the change-in-brightness detection unit 84 in the display device 10A shifts the process to a step S112.

In a step S112, the display-brightness determination unit 85 in the display device 10A determines the display-brightness data 500 that indicates the display brightness of the display data (i.e., the virtual image 45), using the brightness data 450 stored in the brightness-data control table 400. More specifically, the display-brightness determination unit 85 calculates, for example, an average value of the brightness data 450 stored in the brightness-data control table 400, and determines the calculated average value to be the display-brightness data 500. For example, the display-brightness determination unit 85 calculates a median value from the brightness data 450 stored in the brightness-data control table 400, and determines the calculated median value to be the display-brightness data 500.

When the processes in the steps up to the step S104 are performed in the display device 10A according to the present embodiment, the brightness data 450 up to the points in time calculated by multiplying the sampling intervals at which the brightness sensor 70 samples the brightness data by the number of times sampling can be performed (buffer size) with reference to the point in time when the current brightness data 450 is obtained is stored in the brightness-data control table 400. The display-brightness determination unit 85 determines the display-brightness data 500 that indicates the display brightness of the display data, based on all the representative values of the brightness data 450 in the calculated period of time.

In a step S113, the display-brightness determination unit 85 in the display device 10A outputs the determined display-brightness data 500 to the image generator 173. The image generator 173 applies the value of display brightness indicated by the display-brightness data 500 to the display brightness of the display data (i.e., the virtual image 45). Then, the image display unit 174 controls the display to display the display data using the display brightness indicated by the display-brightness data 500 (an example of a displaying step).

In the step S114, when the processes of controlling display brightness are to be continued, the display-brightness controller 178 in the display device 10A repeats the processes from the step S101. On the other hand, the display-brightness controller 178 terminates the processes when the processes of controlling display brightness are not to be continued.

As described above, in the display device 10A, the display brightness of the display data is controlled based on the representative value of the brightness data 450 obtained in chronological order. Due to this configuration, the amount of influence caused by undesired noise in the brightness of the background for the viewer 3 can be reduced. In the display device 10A, the length of delay time it takes before the obtained brightness data 450 is reflected in the display brightness can efficiently be controlled by repeating addition or deletion in chronological order, and thus the effect of the noise of the brightness of the background can be reduced.

In the step S112 of FIG. 17B, an example case in which the display-brightness determination unit 85 calculates an average value of the brightness data 450 is described as above. However, no limitation is intended thereby. For example, the display-brightness determination unit 85 may determine the display-brightness data 500 using a median value of the brightness data 450. Further, the display-brightness determination unit 85 may determine the value obtained by integrating a predetermined constant into the calculated average value or median value to be the display-brightness data 500.

The controlling processes of the display brightness of the display data (i.e., the virtual image 45) in the display device 10A are described below with reference to FIG. 25.

Figure 25:
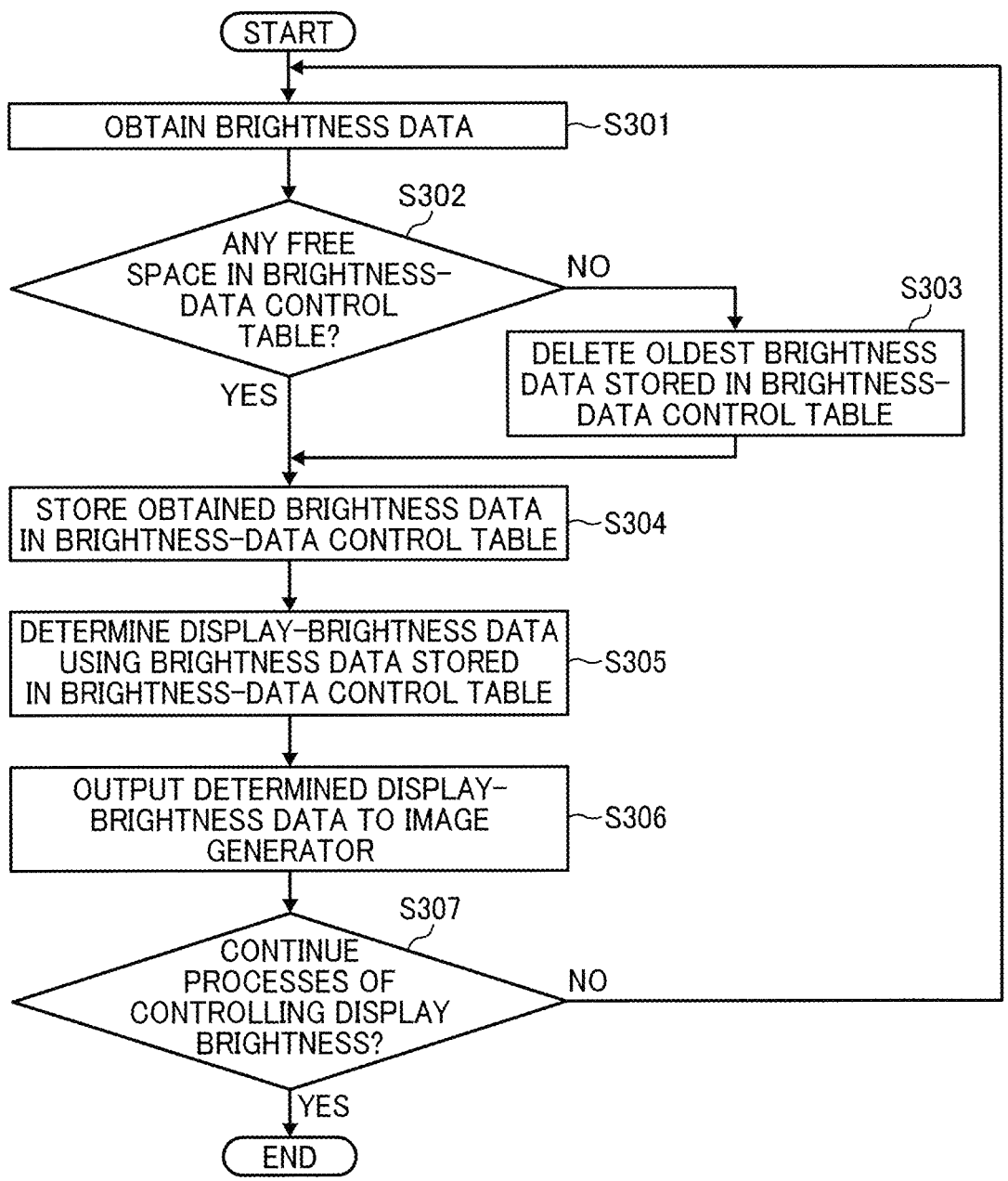
FIG. 25 is a second flowchart of how the display brightness is controlled in a display device according to the first embodiment of the present disclosure.

FIG. 25 is a flowchart of how the display brightness is controlled in the display device 10A according to the first embodiment of the present disclosure.

More specifically, FIG. 25 illustrates an example case in which delay consideration processes or smoothing process is executed in the display device 10A. In the delay consideration processes, the length of delay time it takes before the display brightness of the display data is made to follow the brightness of the background is set. In the smoothing process, the effect of the periodic noise of the brightness of the background is reduced.

In a step S301, the brightness-data acquisition unit 81 in the display device 10A obtains the brightness data 450 from the brightness sensor 70 (an example of an obtaining step). More specifically, the brightness sensor 70 detects the brightness data in the brightness detection field 300 at the sampling intervals determined in advance by the sampling-interval management unit 82. The brightness data indicates the brightness value [cd/m²] in the brightness detection field 300. The brightness data may indicate the illuminance value [lx] in the brightness detection field 300. Then, the brightness-data acquisition unit 81 obtains from the brightness sensor 70 the brightness data 450 including the brightness data detected by the brightness sensor 70.

In a step S302, when free space is available in the brightness-data control table 400, the data processor 83 of the display device 10A shifts the process to a step S304. On the other hand, when no free space is available in the brightness-data control table 400, the data processor 83 shifts the process to a step S303.

As the brightness-data control table 400 is a buffer area having a fixed size, when the stored brightness data 450 reaches an upper limit of the number of times sampling can be performed, the brightness-data control table 400 reaches capacity. Due to this configuration, whether or not the brightness-data control table 400 has free space is determined in the display device 10A to prepare free space in which the brightness data 450 can newly be stored when needed. For example, when the upper limit of the number of times sampling can be performed is four, the brightness data 450 is stored in the brightness-data control table 400 as illustrated in FIG. 15 up to the area of sampling number (m) "4." This means that there is no available free space.

In a step S303, the data processor 83 of the display device 10A deletes the oldest brightness data 450 stored in the brightness-data control table 400. More specifically, for the purposes of preparing free space in the brightness-data control table 400, the data processor 83 deletes the brightness data 450 stored in the area of sampling number (m) "1" of the brightness-data control table 400 as illustrated in FIG. 15. When the brightness data 450 stored in the brightness-data control table 400 is deleted, the data processor 83 shifts the process to a step S304.

In the step S304, the data processor 83 of the display device 10A controls the brightness-data control table 400 to store the brightness data 450 obtained by the brightness-data acquisition unit 81. In so doing, the newly obtained brightness data 450 is stored in the last row of the brightness-data control table 400 in order to clarify the chronological order of the obtained brightness data 450. For example, when the brightness data 450 is stored in the brightness-data control table 400 as illustrated in FIG. 15 up to the area of sampling number (m) "3," the data processor 83 stores the newly obtained brightness data 450 in the area of sampling number (m) "4."

In a step S305, the display-brightness determination unit 85 in the display device 10A determines the display-brightness data 500 using a representative value of the brightness data 450 stored in the brightness-data control table 400 (an example of a determination step). More specifically, for example, the display-brightness determination unit 85 calculates an average value of the brightness value [cd/m$^2$] included in the brightness data 450 stored in the brightness-data control table 400, and determines the calculated average value to be the display-brightness data 500. For example, the display-brightness determination unit 85 calculates a median value of the brightness value [cd/m$^2$] included in the brightness data 450 stored in the brightness-data control table 400, and determines the calculated median value to be the display-brightness data 500.

When the processes in the steps up to the step S304 are performed in the display device 10A according to the present embodiment, the brightness data 450 up to the points in time calculated by multiplying the sampling intervals at which the brightness sensor 70 samples the brightness data by the number of times sampling can be performed (buffer size) with reference to the point in time when the current brightness data 450 is obtained is stored in the brightness-data control table 400. The display-brightness determination unit 85 determines the display-brightness data 500 that indicates the display brightness of the display data, based on all the representative values of the brightness data 450 in the calculated period of time.

When the brightness data detected by the brightness sensor 70 indicates the illuminance value [mlx], the display-brightness determination unit 85 calculates a representative value of the illuminance value [mlx] included in the brightness data 450, and converts the obtained value into a brightness value [cd/m$^2$]. For example, the conversion processes from the illuminance value [mlx] into the brightness value [cd/m$^2$] may be implemented by integrating a predetermined constant into the illuminance value [mlx] obtained as a representative value. When the brightness data detected by the brightness sensor 70 indicates the illuminance value [mlx], the display-brightness determination unit 85 may convert the illuminance value [mlx] included in the brightness data 450 into a brightness value, and then a representative value of the brightness value obtained by the above conversion may be calculated.

In a step S306, the display-brightness determination unit 85 in the display device 10A outputs the determined display-brightness data 500 to the image generator 173. The image generator 173 applies the value of display brightness indicated by the display-brightness data 500 to the display brightness of the display data (i.e., the virtual image 45). Then, the image display unit 174 controls the display to display the display data using the display brightness indicated by the display-brightness data 500 (an example of a displaying step).

In the step S307, when the processes of controlling display brightness are to be continued, the display-brightness controller 178 in the display device 10A repeats the processes from the step S301. On the other hand, the display-brightness controller 178 terminates the processes when the processes of controlling display brightness are not to be continued.

As described above, in the display device 10A, the display brightness of the display data is controlled based on the representative value of the brightness data 450 obtained in chronological order. Due to this configuration, the amount of influence caused by undesired noise in the brightness of the background for the viewer 3 can be reduced. In the display device 10A, the length of delay time it takes before the obtained brightness data 450 is reflected in the display brightness can efficiently be controlled by repeating addition or deletion in chronological order, and thus the effect of the noise of the brightness of the background can be reduced.

In FIG. 25, an example case is described in which all the brightness data 450 stored in the brightness-data control table 400 is used. However, no limitation is indicated thereby, and the display-brightness determination unit 85 may use only the brightness data 450 stored in the area of a particular sampling number (n). In FIG. 25, an example case in which the display-brightness determination unit 85 calculates an average value of the brightness data 450 is described as above. However, no limitation is intended thereby. For example, the display-brightness determination unit 85 may determine the display-brightness data 500 using a median value of the brightness data 450. Further, the display-brightness determination unit 85 may determine the value obtained by integrating a predetermined constant into the calculated average value or median value to be the display-brightness data 500.

Figure 24A:
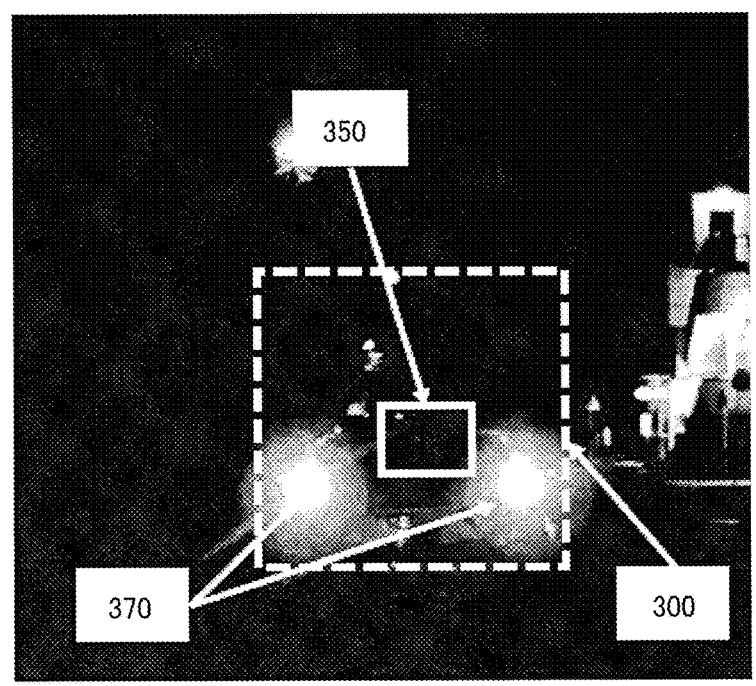
FIG. 24A and FIG. 24B are diagrams each illustrating a concrete example of the influence of periodic noise in the viewing field of a viewer.
Figure 24B:
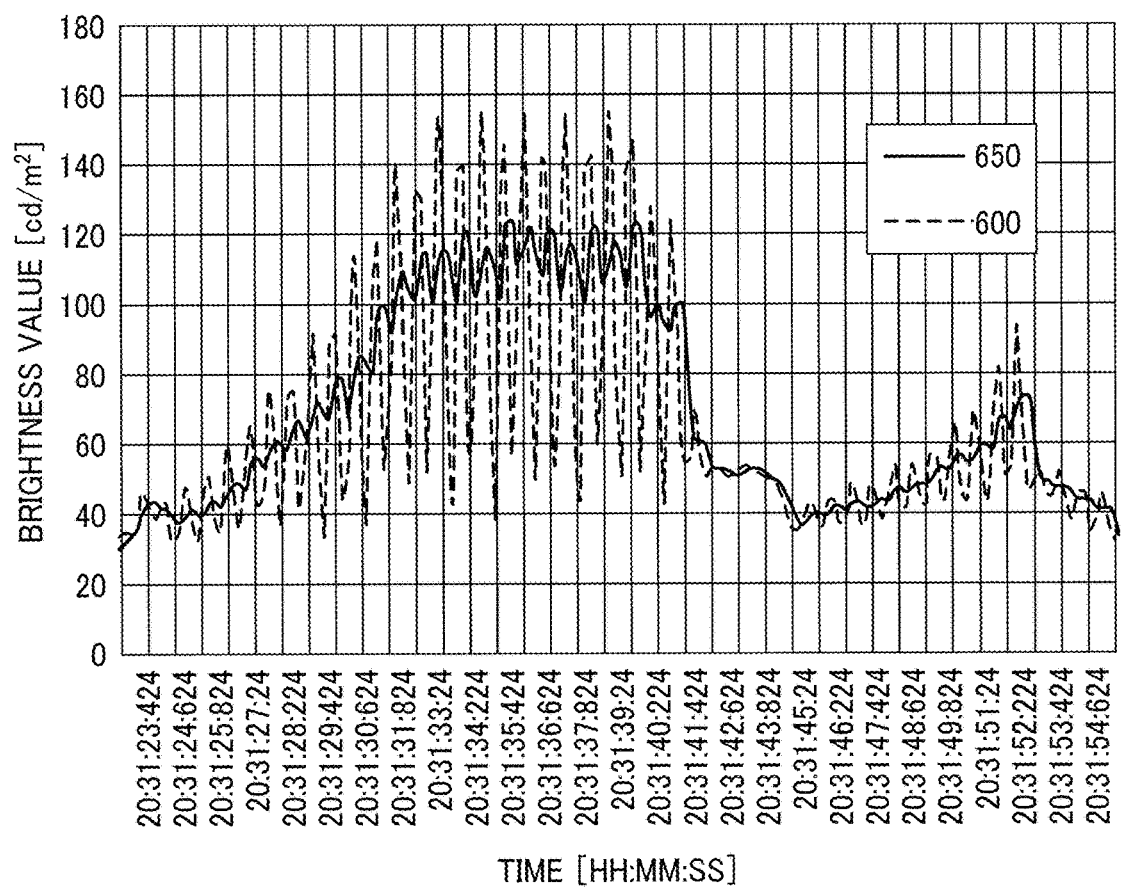

FIG. 24A and FIG. 24B are diagrams each illustrating a concrete example of periodic noise in brightness in the viewing field of a driver.

The image illustrated in FIG. 24A is an image where the brightness detection field 300 and the background display area 350 are added to the background image (scenery image) ahead of the mobile object captured using a drive recorder provided for a vehicle.

FIG. 24A illustrates a situation in which direction indicators 370 of a preceding vehicle blink.

In the image as illustrated in FIG. 24A, the brightness detection field 300 includes the direction indicator 370 of a preceding vehicle, but the background display area 350 does not include the direction indicators 370. In this example case, the brightness of the background does not change in the background display area 350, but the display brightness that is determined based on the brightness data in the brightness detection field 300 may be affected by the blinking of the direction indicators 370.

FIG. 24B indicates the brightness data 600 detected in the brightness detection field 300 in the situation as illustrated in the image of FIG. 24A, and the processed data 650 in which the display brightness is controlled based on the brightness data 600.

In the graph as illustrated in FIG. 24B, the vertical axis indicates the brightness value [$cd/m^2$] indicating the degree of the detected brightness, and the horizontal axis indicates the time at which the brightness value is obtained. Compared with the detected brightness data 600, it is understood that the influence of undesired periodic changes in brightness, which is caused as the light of the direction indicators 370 gets into the brightness detection field 300, is reduced in the processed data 650. This is because as illustrated in FIG. 25, a plurality of representative values of the brightness data 450 are calculated and the obtained brightness data 600 is made smooth in the display device 10A.

In Japan, the direction indicators 370 for a vehicle are under obligation to blink at regular time intervals of 60 to 120 times per minute. In view of such circumstances, preferably, the brightness data 450 is obtained (the sampling interval is set) at time intervals shorter than 500 milliseconds (msec) in the display device 10A as the time intervals at which the direction indicators 370 blink are 500 msec at shortest.

An example of periodic noise caused by the direction indicators 370 for a vehicle is described with reference to FIG. 24A and FIG. 24B. However, the display-brightness controlling processes according to the present embodiment are also effective for the periodic noise caused by a blinker or the like arranged at a branch point of a road or in a pedestrian walkway along a road. The display-brightness controlling processes according to the present embodiment are also effective for the light that gets into the vehicle from street lamps while the vehicle is travelling at a constant speed. Further, in addition to the nighttime, the display-brightness controlling processes according to the present embodiment may be applied to changes in brightness in the brightness detection field 300 caused by, for example, the shade of roadside trees during the daytime.

As described above, in the display system 1A according to the first embodiment of the present disclosure, changes in display brightness that are unpleasant for the viewer 3, which are caused by following the periodic changes in brightness at relatively short intervals in the brightness detection field 300 including at least some of the background display area 350 where the display data (i.e., the virtual image 45) is superimposed, are reduced. Accordingly, in the display system 1A, the visibility of the display data (i.e., the virtual image 45) can be improved. brightness can be implemented using the delay time within range of the permissible delay time T. Concrete examples of the abrupt changes in brightness in the viewing field of the driver (i.e., the viewer 3) are described below with reference to FIG. 18A, FIG. 18B, FIG. 19A, and FIG. 19B.

Figure 18A:
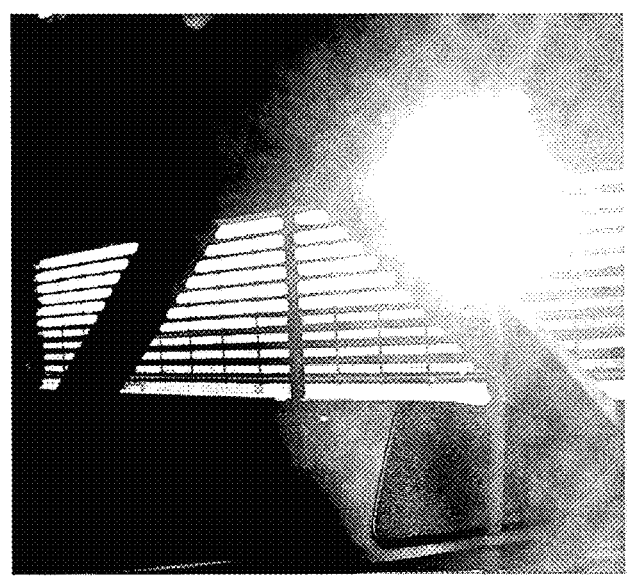
FIG. 18A and FIG. 18B are diagrams each illustrating a concrete example of the influence of abrupt changes in brightness in the viewing field of a viewer.
Figure 18B:
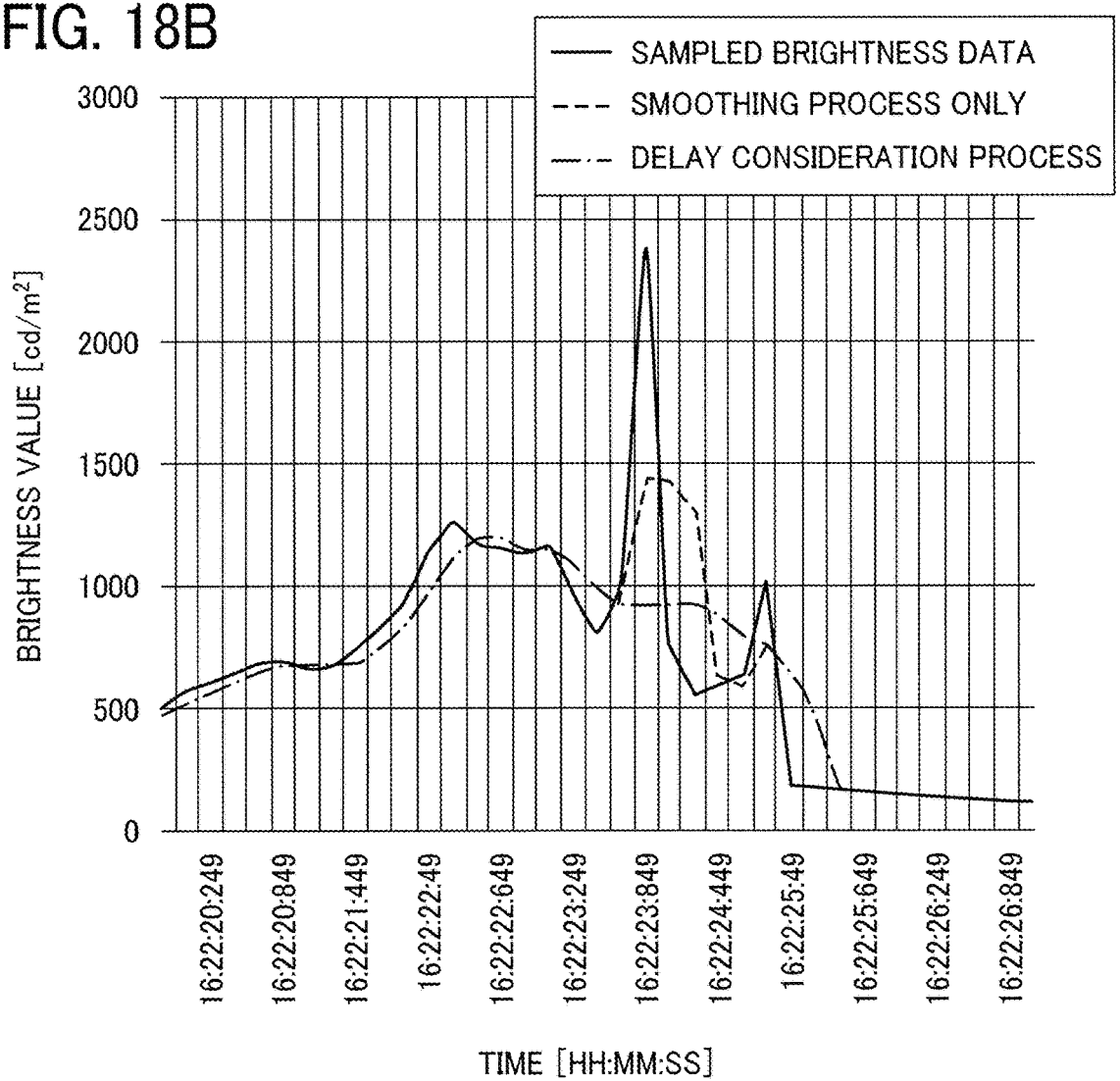

FIG. 18A and FIG. 18B are diagrams each illustrating a concrete example of the influence of abrupt changes in brightness in the viewing field of the viewer 3.

The image illustrated in FIG. 18A is the background image (scenery image) ahead of the mobile object captured using a drive recorder provided for a vehicle. In FIG. 18A, a situation is illustrated in which sunlight enters inside the multistory parking lot through which wind blows. FIG. 18B indicates the brightness data 600 detected in the brightness detection field 300 in the situation as illustrated in the image of FIG. 18A, and the processed data 650 in which the display brightness is controlled based on the brightness data 600. In the graph as illustrated in FIG. 18B, the vertical axis indicates the brightness value [$cd/m^2$] of the detected brightness data, and the horizontal axis indicates the time at which the brightness data is obtained.

The brightness sensor 70 provided for a vehicle detects abrupt changes in brightness of background as illustrated in FIG. 18B as the sunlight gets into the brightness detection field 300 ahead of the vehicle. In the situation as illustrated in FIG. 18A, the inside of a multistory parking lot is dark. Accordingly, the brightness contrast is high, and thus the influence of abrupt noise is stronger.

In this configuration, the value of display brightness in which only the smoothing process (for example, the processes in the step S112 of FIG. 17B) is performed on the sampled brightness data indicates smooth changes in brightness than the sampled brightness data (i.e., the actual brightness of the background). However, some of the noise that is caused by abrupt changes in brightness of background remains in the display brightness on which only the smoothing process is performed, and the viewer 3 may feel awkward about the display due to the influence of such remaining noise.

On the other hand, the influence of abrupt noise caused by abrupt changes in brightness of background is hardly observed in the value of display brightness obtained by performing delay consideration processes (for example, the processes in the steps S107 to S109 of FIG. 17B) on the sampled brightness data. This is because in the display device 10A, the peak of the brightness value [$cd/m^2$] caused by the influence of abrupt noise is attenuated as changes in display brightness in response to the changes in brightness of background are delayed in the delay consideration processes.

Figure 19A:
FIG. 19A and FIG. 19B are diagrams each illustrating another concrete example of the influence of abrupt changes in brightness in the viewing field of a viewer.
Figure 19B:
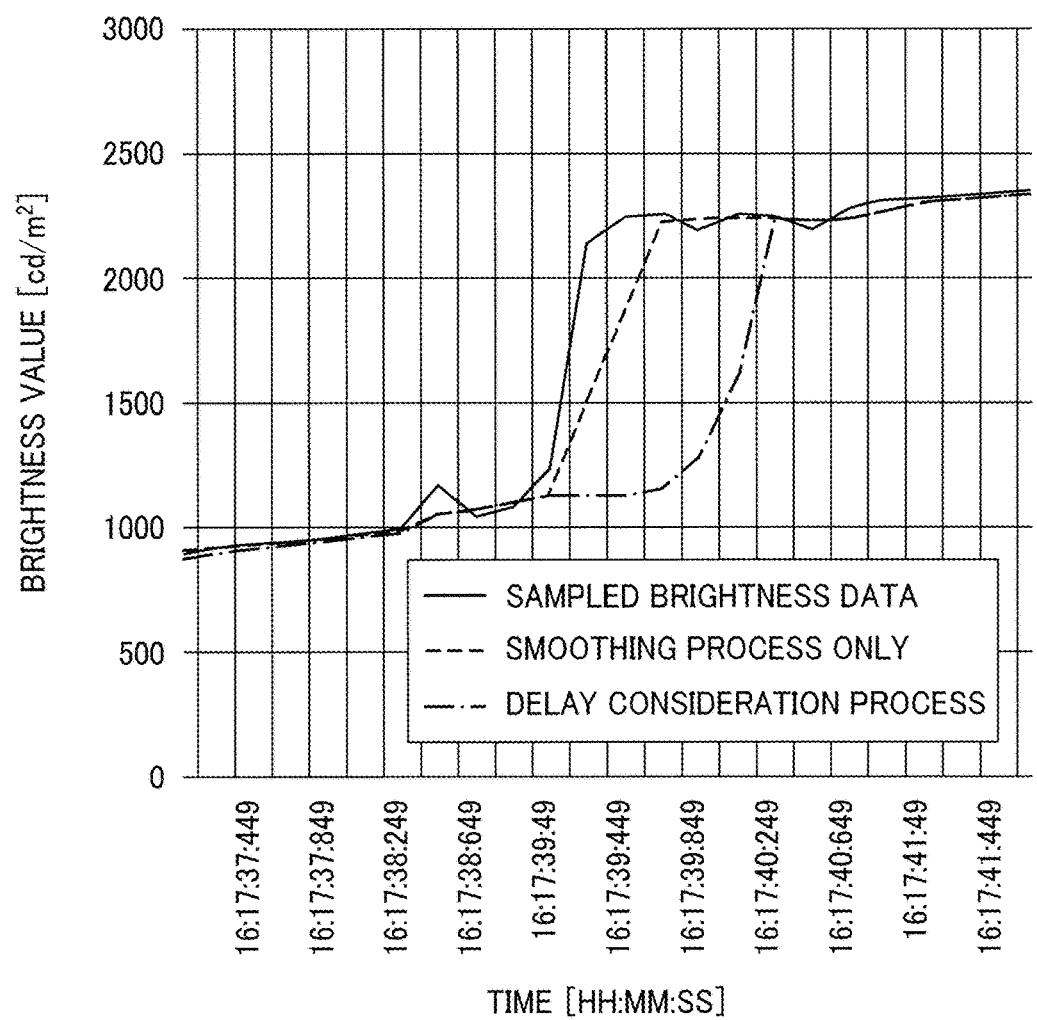

FIG. 19A and FIG. 19B are diagrams each illustrating another concrete example of the influence of abrupt changes in brightness in the viewing field of the viewer 3.

In a similar manner to FIG. 18A, the image illustrated in FIG. 19A is the background image (scenery image) ahead of the mobile object captured using a drive recorder provided for a vehicle. FIG. 19A illustrates a situation in which a vehicle that is traveling forward has moved from a shady place to a sunny place. FIG. 19B indicates the brightness data 600 detected in the brightness detection field 300 in the situation as illustrated in the image of FIG. 19A, and the processed data 650 in which the display brightness is controlled based on the brightness data 600. In the graph as illustrated in FIG. 19B, the vertical axis indicates the brightness value [$cd/m^2$] of the detected brightness data, and the horizontal axis indicates the time at which the brightness data is obtained.

As backlight gets into the brightness detection field 300 ahead of the vehicle, the brightness sensor 70 provided for a vehicle detects abrupt changes in brightness of background as illustrated in FIG. 19B. In this configuration, the value of display brightness obtained by performing only the smoothing process (for example, the processes in the step S112 of FIG. 17B) on the sampled brightness data indicates gentler changes in brightness than the actual brightness of the background indicated by the sampled brightness data.

The value of display brightness obtained by performing delay consideration processes (for example, the processes in the steps S107 to S109 of FIG. 17B) on the sampled brightness data indicates even gentler changes in brightness than the value of display brightness obtained by performing only the smoothing process. This is because the length of delay time it takes before the display brightness is made to follow the brightness of the background is provided in the display device 10A by the delay consideration processes.

In the situation as illustrated in FIG. 19A and FIG. 19B, the delay consideration processes are performed in the display device 10A, and changes in display brightness are made gentler compared with cases in which only smoothing processes are performed. Due to this configuration, the awkwardness the viewer 3 might feel in the display can be reduced. On the other hand, the delay time gets longer compared with cases in which only smoothing processes are performed as changes in the brightness value of the brightness of the background are big in the situation as illustrated in FIG. 19A and FIG. 19B. As too long delay time leads to the awkwardness the viewer 3 might feel, the delay time needs to fall within range of the permissible delay time T. In the display device 10A of the concrete example illustrated in FIG. 19B, the display brightness is made to follow the brightness value of the brightness of the background with the delay time of about 0.8 seconds (sec) in response to the permissible delay time T=1.4 sec.

The effect of incident light in a multistory parking lot and the effect of backlight caused by the movement from a shady place to a sunny place are described with reference to FIG. 18A, FIG. 18B, FIG. 19A, and FIG. 19B. However, the display-brightness controlling processes according to the present embodiment are not limited to these example cases. The display-brightness controlling processes according to the present embodiment are applicable to various kinds of situations where the brightness abruptly changes.

Permissible Delay Time

The permissible delay time in the display system 1A is described below with reference to FIG. 20A, FIG. 20B, FIG. 21A, and FIG. 21B.

FIG. 20A, FIG. 20B, FIG. 21A, and FIG. 21B illustrate the statistical results of the sensory evaluation performed on a test subject (i.e., the viewer 3) who visually recognizes the display data.

Figures 20A, 20B:
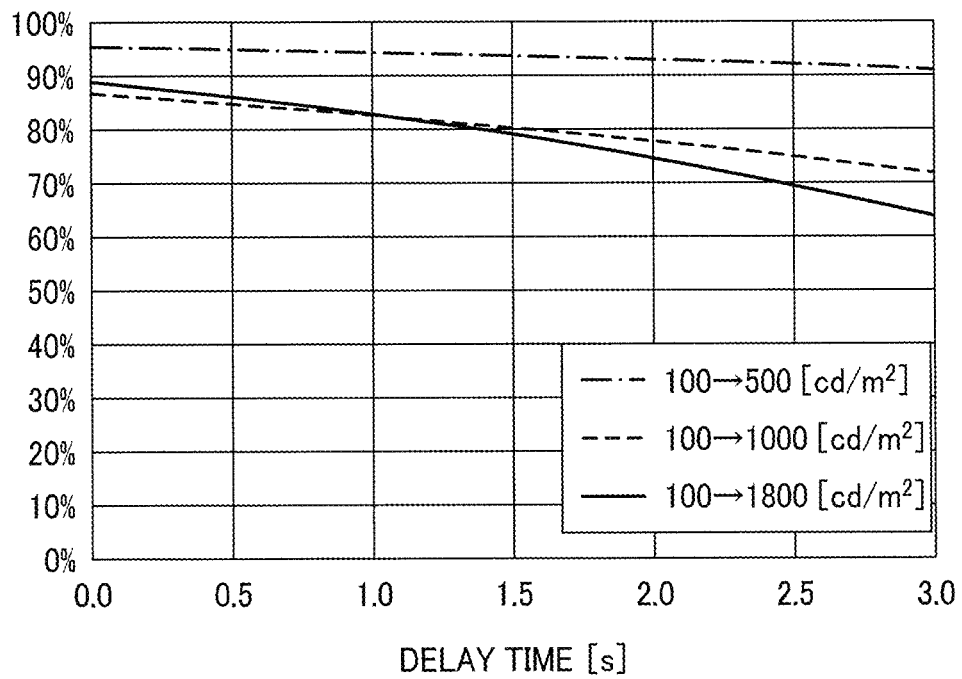
FIG. 20A and FIG. 20B are diagrams each illustrating permissible delay time in a display system according to the first embodiment of the present disclosure.

FIG. 20A and FIG. 20B are diagrams each illustrating permissible delay time in the display system 1A according to the first embodiment of the present disclosure.

The graph as illustrated in FIG. 20A illustrates the relation between the length of time it takes to change the display brightness when the brightness of the background is significantly changed from a dark condition to a bright condition and the awkwardness a test subject (i.e., the viewer 3) might feel. In the graph as illustrated in 20A, the vertical axis indicates the probability (%) in which the test subject (i.e., the viewer 3) does not feel awkward about the changes in display brightness in statistics on sensory evaluation of the test subject (i.e., the viewer 3), and the horizontal axis indicates the delay time (sec) by which changes in display brightness are delayed.

FIG. 20A illustrates the statistical results of three patterns of changes in brightness, including a case in which the brightness value of the brightness of the background is changed from 100 [$cd/m^2$] to 500 [$cd/m^2$], a case in which the brightness value of the brightness of the background is changed from 100 [$cd/m^2$] to 1000 [$cd/m^2$], and a case in which the brightness value of the brightness of the background is changed from 100 [$cd/m^2$] to 1800 [$cd/m^2$]. In all the cases, as the delay time by which changes in display brightness are delayed gets longer, the probability in which the test subject (i.e., the viewer 3) does not feel awkward about the changes in display brightness gets lower.

FIG. 20B illustrates the delay time where 80% of the test subjects (i.e., the viewers 3) do not feel awkward about the changes in display brightness in the graph as illustrated in FIG. 20A.

As illustrated in FIG. 20B, as the changes in the brightness of the background are greater, the delay time where a test subject (i.e., the viewer 3) does not feel awkward gets shorter. Preferably, in the display device 10A, the delay time when the brightness of the background is changed from 100 [$cd/m^2$] to 1800 [$cd/m^2$], where the delay time in which a test subject (i.e., the viewer 3) does not feel awkward is the shortest, is set to the permissible delay time T. In this example case, the permissible delay time T=1.45 sec as illustrated in FIG. 20B.

Figures 21A, 21B:
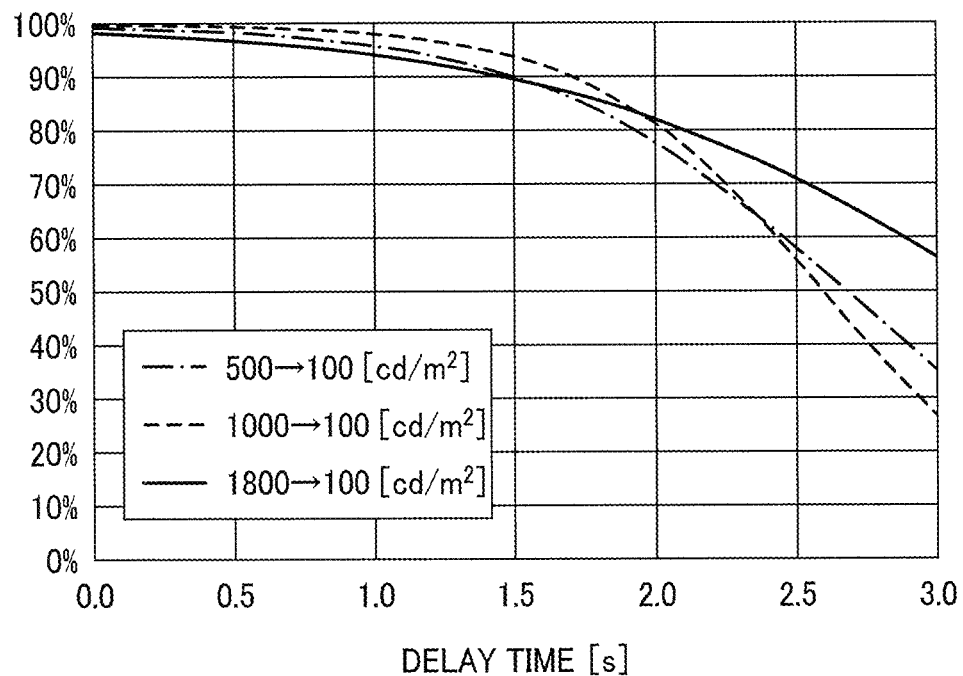
FIG. 21A and FIG. 21B are diagrams each illustrating permissible delay time in a display system according to the first embodiment of the present disclosure.

Cases in which the brightness of the background is significantly changed from a bright condition to a dark condition are described below with reference to FIG. 21A and FIG. 21B. The graph as illustrated in FIG. 21A illustrates the relation between the length of time it takes to change the display brightness when the brightness of the background is significantly changed from a bright condition to a dark condition and the awkwardness a test subject (i.e., the viewer 3) might feel. In the graph of FIG. 21A, the vertical axis indicates the probability (%) in which the test subject (i.e., the viewer 3) does not feel awkward about the changes in display brightness in statistics on sensory evaluation of the test subject (i.e., the viewer 3), and the horizontal axis indicates the delay time (sec) by which changes in display brightness are delayed.

FIG. 21A illustrates the statistical results of three patterns of changes in brightness, including a case in which the brightness value of the brightness of the background is changed from 500 [$cd/m^2$] to 100 [$cd/m^2$], a case in which the brightness value of the brightness of the background is changed from 1000 [$cd/m^2$] to 100 [$cd/m^2$], and a case in which the brightness value of the brightness of the background is changed from 1800 [$cd/m^2$] to 100 [$cd/m^2$].

In all the cases, as the delay time by which changes in display brightness are delayed gets longer, the probability in which the test subject (i.e., the viewer 3) does not feel awkward about the changes in display brightness gets lower.

FIG. 21B illustrates the delay time where 80% of the test subjects (i.e., the viewers 3) do not feel awkward about the changes in display brightness in the graph as illustrated in FIG. 21A.

As illustrated in FIG. 21B, as the changes in the brightness of the background are smaller, the delay time where a test subject (i.e., the viewer 3) does not feel awkward gets shorter. Preferably, in the display device 10A, the delay time when the brightness of the background is changed from 500 [$cd/m^2$] to 100 [$cd/m^2$], where the delay time in which a test subject (i.e., the viewer 3) does not feel awkward is the shortest, is set to the permissible delay time T. In this example case, the permissible delay time T=1.9 sec as illustrated in FIG. 21B.

As described above, in the display device 10A, the length of delay time it takes before the display brightness of the display data (i.e., the virtual image 45) is made to follow the brightness of the background is made to fall within the permissible delay time T where the viewers 3 do not feel awkward about the changes in display brightness. Note also that the probability in which the viewers 3 do not feel awkward about the changes in display brightness, which is used as a statistic used for setting the permissible delay time T, is not limited to 80% and is adjustable as appropriate.

As illustrated in FIG. 20A, FIG. 20B, FIG. 21A, and FIG. 21B, the delay time where the viewers 3 do not feel awkward about the changes in display brightness differs depending on how the brightness changes (for example, changes from a bright condition to a dark condition or changes from a bright condition to a dark condition). For this reason, in the display device 10A, different permissible delay times T are set depending on how the brightness changes as in the permissible delay time data 90 as illustrated in FIG. 16. Due to this configuration, the display brightness can be changed so as to further reduce the awkwardness the viewer 3 might feel. In addition to the determination on how the brightness changes, varying values may be set to the permissible delay time T according to the degree of changes in brightness as illustrated in FIG. 20A, FIG. 20B, FIG. 21A, and FIG. 21B.

As described above, in the display system 1A according to the first embodiment of the present disclosure, delay time equal to or shorter than the permissible delay time T is set when changes in the brightness of the background are detected, and the display brightness is changed in a gradual manner. Accordingly, in the display system 1A, even when the brightness of the background abruptly changes, the visibility of the display data can be improved while reducing the awkwardness the viewer 3 might feel. When changes in the brightness of the background are not detected in the display system 1A, the display-brightness data 500 is determined using a representative value of the brightness data 450 stored in the display device 10A. Due to this configuration, the display brightness controlling processes can be performed on a continual basis regardless of whether abrupt changes in brightness are detected.

Modification of First Embodiment

A modification of the first embodiment of the present disclosure is described below. Note that like reference signs are given to like elements or functions similar to those described as above in the first embodiment, and their detailed description is omitted. In a display system according to the present modification of the first embodiment, the relative positions of the background display area 350 and the brightness detection field 300 in which detection is performed by the brightness sensor 70 are different from those of the first embodiment as described above.

Figure 22A:
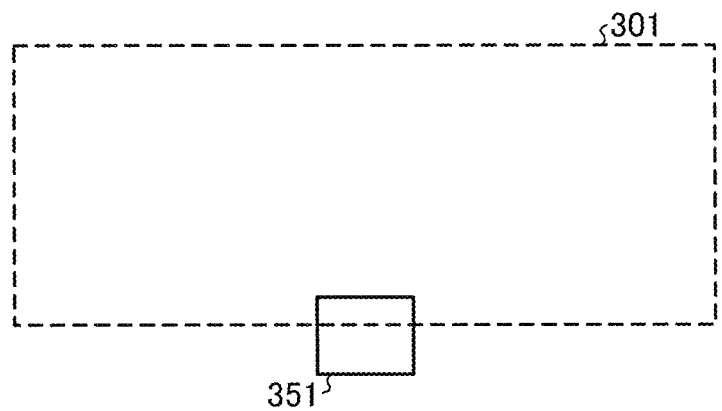
FIG. 22A, FIG. 22B, and FIG. 22C are diagrams each illustrating the relation between a brightness detection field and a background display area, according to a modification of the first embodiment of the present disclosure.
Figure 22B:
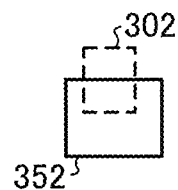
Figure 22C:
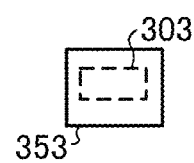

FIG. 22A, FIG. 22B, and FIG. 22C are diagrams each illustrating the relation between the brightness detection field and the background display area, according to the present modification of the first embodiment as described above.

As illustrated in FIG. 10, in the first embodiment, example cases in which the brightness detection field 300 contains the background display area 350 are described. However, no limitation is intended thereby, and the relative positions of the background display area 350 and the brightness detection field 300 may be different from the relative positions described as above in the first embodiment.

In an example case illustrated in FIG. 22A, a portion of a brightness detection field 301 overlaps with a portion of a background display area 351. In a similar manner, in an example case illustrated in FIG. 22B, a portion of a brightness detection field 302 overlaps with a portion of a background display area 352. In an example case illustrated in FIG. 22B, the area of the brightness detection field 302 outside the area of the background display area 352 is smaller compared with the example case illustrated in FIG. 22A. When the relative positions illustrated in FIG. 22B is adopted in the display device 10A, the possibility in which noise that has no influence on the changes in brightness in the background display area 352 is detected can be reduced compared with the example case illustrated in FIG. 22A.

In an example case illustrated in FIG. 22C, a brightness detection field 303 is included in a background display area 353. When the relative positions illustrated in FIG. 22C is adopted in the display device 10A, the brightness data detected in the brightness detection field 303 indicates the brightness of the background within range of the background display area 353. Accordingly, changes in the brightness of the background of the background display area 353 can precisely be reflected.

In the display system 1A, the display-brightness controlling processes as described above with reference to FIG. 17A and FIG. 17B can be applied to any one of the example cases as illustrated in FIG. 22A, FIG. 22B, and FIG. 22C. In FIG. 10, FIG. 22A, FIG. 22B, and FIG. 22C, example cases in which at least some of the brightness detection field and the background display area overlaps are described. However, no limitation is indicated thereby, and it is not always necessary for the brightness detection field and the background display area to overlap with each other.

Second Embodiment

A configuration of a second embodiment of the present disclosure is described below. Note that like reference signs are given to like elements or functions similar to those described as above in the first embodiment, and their detailed description is omitted. The display system 1B according to the second embodiment of the present disclosure the display-brightness data 500 that is obtained by performing the delay consideration processes n times, which is determined based on the brightness value [cd/m$^2$] of the brightness of the background, is determined to be used as a fixed value, and the display brightness is changed in a gradual manner using the determined display-brightness data 500.

Figure 23A:
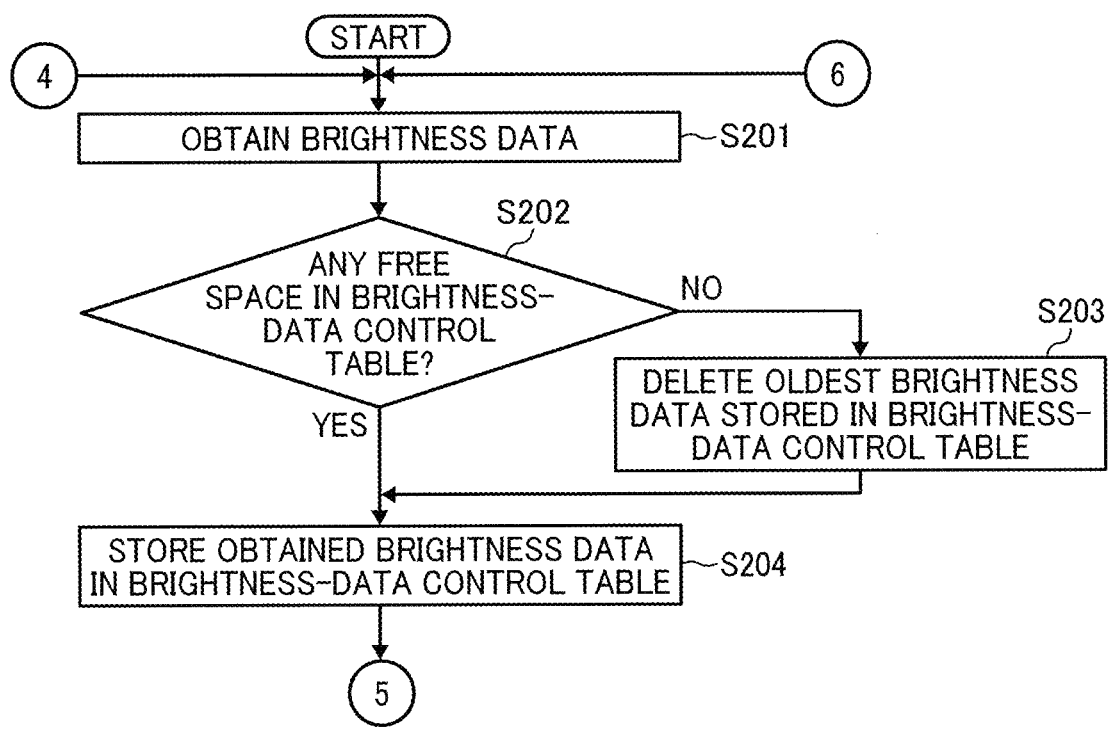
FIG. 23A and FIG. 23B are a first flowchart of how the display brightness is controlled in a display device according to a second embodiment of the present disclosure.
Figure 23B:
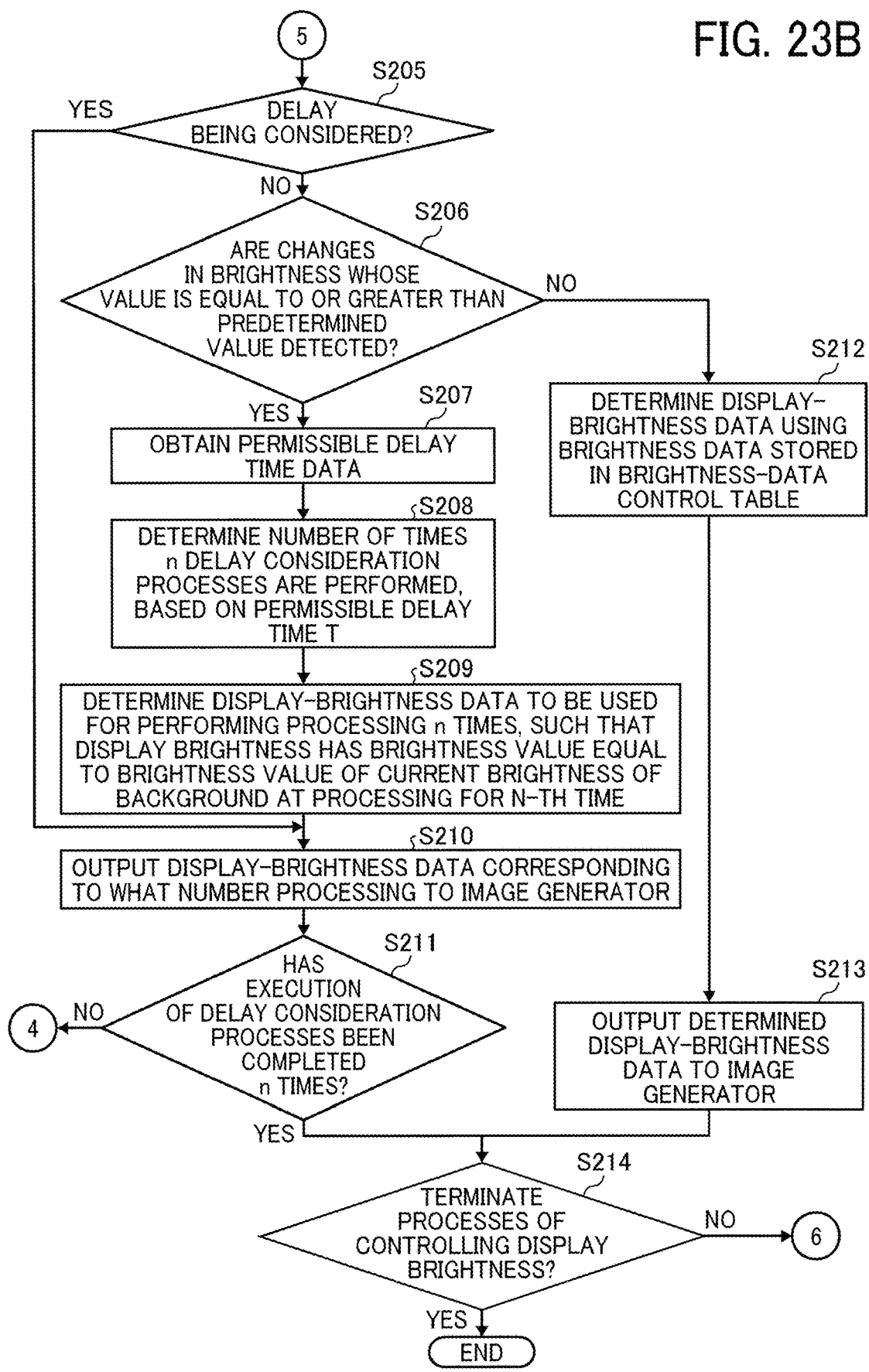

FIG. 23A and FIG. 23B are a flowchart of how the display brightness is controlled in a display device according to the second embodiment of the present disclosure. Note that the processes in steps S201 to S204 as illustrated in FIG. 23A are equivalent to the processes in the steps S101 to S104 as illustrated in FIG. 17A and thus its description is omitted. In a similar manner to the first embodiment, the value included in the brightness data 450 is not limited to the brightness value [cd/m$^2$], but may be the illuminance value [lx].

When the delay consideration processes are being performed in a step 205, the display device 10B shifts the process to a step S210. On the other hand, when the delay consideration processes are not being performed in the step S205, the display device 10B shifts the process to a step S206.

In the step S206, when changes in the brightness of the background are detected based on the brightness value [$cd/m^2$] indicated by the brightness data 450 obtained by the brightness-data acquisition unit 81, the change-in-brightness detection unit 84 in the display device 10B shifts the process to a step S207. More specifically, the change-in-brightness detection unit 84 compares the brightness value [$cd/m^2$] indicated by the brightness data 450 newly obtained by the brightness-data acquisition unit 81 with the brightness value [$cd/m^2$] indicated by the brightness data 450 stored in the brightness-data control table 400, and when a difference whose value is equal to or greater than a predetermined value is detected, changes in brightness whose value is equal to or greater than a predetermined value is detected. A predetermined value that is used to detect changes in brightness is stored in advance as a set value in the display device 10B. For example, such a predetermined value that is used to detect changes in brightness is set such that abrupt changes in brightness of background that are caused by, for example, the sunlight and the headlight of a vehicle travelling from the opposite direction are detectable.

When changes in the brightness of the background are detected and the value of such detected changes is equal to or greater than a predetermined value, the change-in-brightness detection unit 84 judges the detected changes in brightness. For example, the change-in-brightness detection unit 84 detects an increase in the brightness value [$cd/m^2$] of the brightness of the background (for example, changes in brightness from IL to IH as illustrated in FIG. 11) or a reduction in the brightness value [$cd/m^2$] of the brightness of the background (for example, changes in brightness from IH to IL as illustrated in FIG. 11). Then, the change-in-brightness detection unit 84 outputs the result of determination to the display-brightness determination unit 85.

On the other hand, in a step S206, when changes in brightness whose value is equal to or greater than a predetermined value are not detected based on the brightness value [$cd/m^2$] indicated by the brightness data 450 obtained by the brightness-data acquisition unit 81, the change-in-brightness detection unit 84 in the display device 10B shifts the process to a step S212. The smoothing processes of brightness data in steps S212 to S214 are equivalent to the processes in the steps S112 to S114 as illustrated in FIG. 17B and thus its description is omitted.

In a step S207, the display-brightness determination unit 85 in the display device 10B reads the permissible delay time data 90 stored in the storage unit 800. More specifically, the display-brightness determination unit 85 reads the permissible delay time T that is determined by the change-in-brightness detection unit 84 depending on how the brightness changes. When it is determined by the change-in-brightness detection unit 84 that the brightness value of the brightness of the background has increased, for example, the display-brightness determination unit 85 reads the permissible delay time T corresponding to the changes in brightness from a dark condition to a bright condition as illustrated in FIG. 16.

In a step S208, the display-brightness determination unit 85 in the display device 10B determines the number of times "n" the delay consideration processes are to be performed on the brightness data 450 used to determine the display-brightness data 500, based on the obtained permissible delay time T. A method of determining the number of times "n" the delay consideration processes are to be performed is similar to the method in the step S108 as illustrated in FIG. 17B and thus its description is omitted.

In a step S209, the display-brightness determination unit 85 in the display device 10B determines the display-brightness data 500 to be used for performing processing n times to be a fixed value, such that the display brightness is changed in a gradual manner and [the display brightness] has a brightness value corresponding to the brightness value [$cd/m^2$] of the [current] brightness of the background at the [processing] for the n-th time in the determined number of times the delay consideration processes are to be performed. More specifically, for example, when the brightness value indicated by the newly obtained brightness data 450 is 1000 [$cd/m^2$] and the determined number of times the delay consideration processes are to be performed is four, the display-brightness determination unit 85 determines the display-brightness data 500 to be used for performing processing four times such that the brightness value indicated by the display-brightness data 500 obtained in the delay consideration processes performed for fourth time becomes 1000 [$cd/m^2$]. In such a configuration, the display-brightness determination unit 85 integrates a predetermined constant that corresponds to each set of the delay consideration processes into the value of the difference between the current display brightness and the current brightness of the background. Then, the display-brightness determination unit 85 adds the integrated value to the current value of display brightness. Accordingly, the display-brightness data 500 corresponding to the delay consideration processes performed for the first to fourth times is determined.

For example, cases are described in which the first, second, third, and the fourth constants are 0.16, 0.256, 0.655, and 1.0, respectively, and the current display brightness and the current brightness of the background are 500 [$cd/m^2$] and 1000 [$cd/m^2$], respectively. In such a configuration, the display-brightness data 500 corresponding to the delay consideration processes performed for the first time becomes 580 [$cd/m^2$] obtained by integrating the first constant "0.16" into "500" that is the value of the difference between the current display brightness and the current brightness of the background and adding the integrated value "80" to the current value of display brightness. In a similar manner, the display-brightness data 500 corresponding to the delay consideration processes performed for the second time becomes 628 [$cd/m^2$], and the display-brightness data 500 corresponding to the delay consideration processes performed for the third time becomes 827.5 [$cd/m^2$]. The display-brightness data 500 corresponding to the delay consideration processes performed for the fourth time becomes 1000 [$cd/m^2$].

As described above, the display-brightness determination unit 85 in the display device 10B changes the display-brightness data 500 corresponding to the delay consideration processes being performed at the moment in a gradual manner, such that the display-brightness data 500 obtained in the delay consideration processes performed for n-th time, among the determined number of times the delay consideration processes are to be performed, takes a value equivalent to the brightness value [$cd/m^2$] of the current brightness of the background.

In the step S210, the display-brightness determination unit 85 in the display device 10B outputs the determined display-brightness data 500 to the image generator 173. The image generator 173 applies the value of display brightness indicated by the display-brightness data 500 to the display brightness of the display data (i.e., the virtual image 45). Then, the image display unit 174 controls the display to display the display data using the display brightness indicated by the display-brightness data 500.

In a step S211, the display device 10B shifts the process to a step S214 when execution of the delay consideration processes is completed n times as determined by the display-brightness determination unit 85. When it is determined in the step S214 that the processes of controlling display brightness are to be continued, the display-brightness controller 178 in the display device 10B repeats the processes from the step S201. On the other hand, the display-brightness controller 178 terminates the processes when the processes of controlling display brightness are not to be continued.

When it is determined in the step S211 that execution of the delay consideration processes is not yet completed n times as determined by the display-brightness determination unit 85, the display device 10B repeats the processes from the step S201. Then, in the display device 10B, by repeating the delay consideration processes n times as determined as above. For example, as illustrated in FIG. 11, the display brightness is changed in a gradual manner, and the display brightness is made to follow the brightness value of the brightness of the background within the permissible delay time T. Due to this configuration, in the display device 10B, even when abrupt changes in the brightness of the background are detected, the display brightness is changed with appropriate delay. Due to this configuration, the display brightness can be made to follow the brightness of the background without causing the viewer 3 to feel awkward.

As described above, the display brightness is made to follow the brightness of the background within the permissible delay time T in the display system 1B according to the second embodiment of the present disclosure. In such a configuration, the display-brightness data 500 obtained by performing the delay consideration processes n times is determined based on the brightness value [cd/m²] of the brightness of the background, and the display brightness is changed in a gradual manner using the determined display-brightness data 500. Accordingly, in the display system 1B, more natural changes in display brightness can be implemented using the delay time within range of the permissible delay time T.

Third Embodiment

A configuration of a third embodiment of the present disclosure is described below. Note that like reference signs are given to like elements or functions similar to those described as above in the first embodiment, and their detailed description is omitted. When periodic noise is detected in the display system 1B according to the second embodiment of the present disclosure, the display-brightness data 500 is not determined using all the brightness data 450 stored in the brightness-data control table 400. Instead, the display-brightness data 500 is determined upon reducing the brightness value that corresponds to the periodic noise.

In the situation as illustrated in FIG. 24A and FIG. 24B, the direction indicators 370 do not exist in the background display area 350. In other words, the actual brightness in the background display area 350 is equivalent to the brightness when the direction indicators 370 are turned off. However, in the situation as illustrated in FIG. 24A and FIG. 24B, the light emitted from the direction indicators 370 is included in the brightness detection field 300 from which brightness data is sampled to determine the display brightness. Due to this configuration, the display brightness is determined to be higher than the actual brightness in the background display area 350.

In view of such circumstances, in the display device 10B according to the second embodiment, the value of the display brightness is set to be lower than the average of the brightness data 450. Due to this configuration, the display brightness of the background display area 350 can be set close to the actual brightness.

Figure 26:
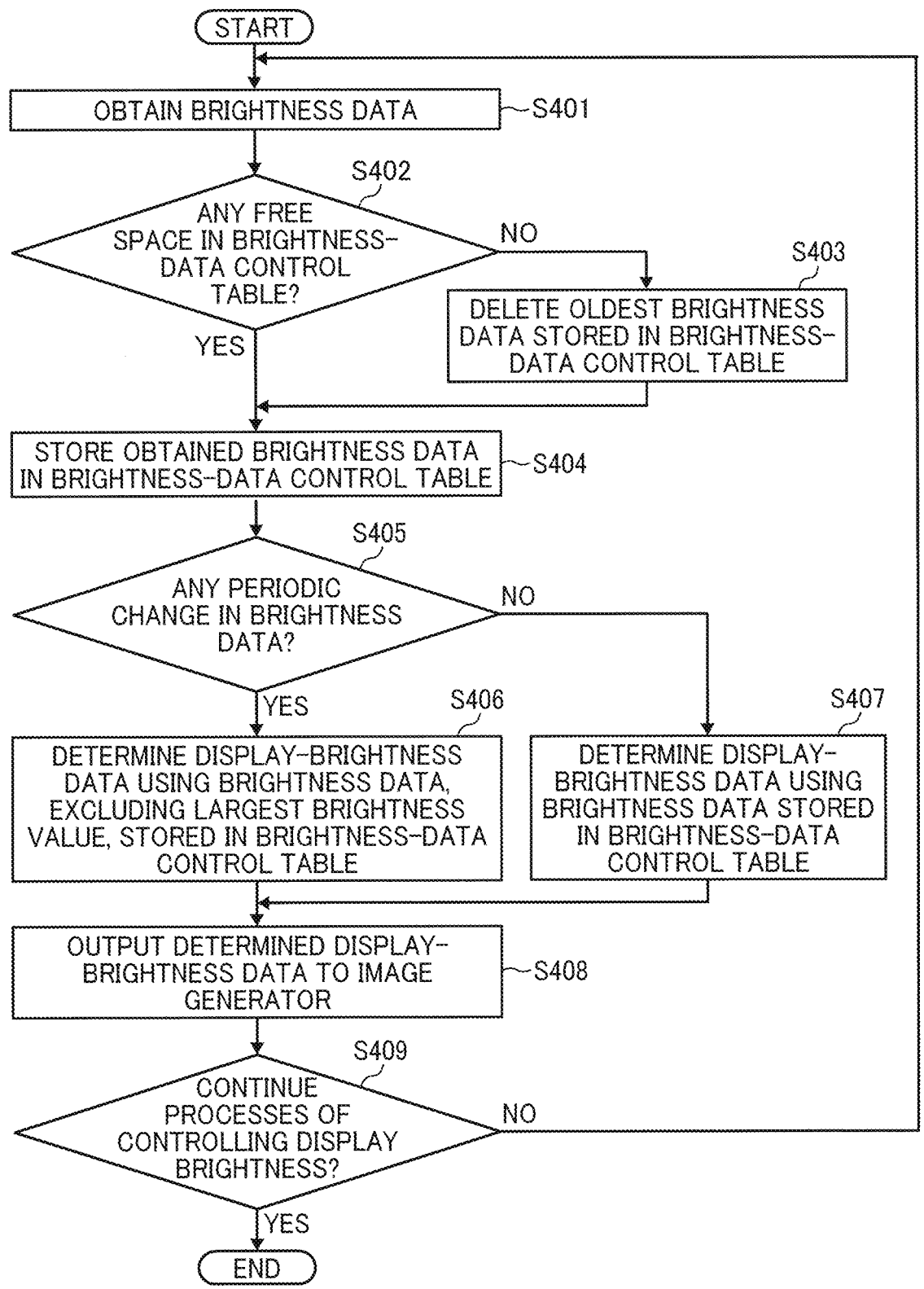
FIG. 26 is a second flowchart of how the display brightness is controlled in a display device according to a second embodiment of the present disclosure.

FIG. 26 is a flowchart of how the display brightness is controlled in a display device according to the second embodiment of the present disclosure.

Note that the processes in steps S401 to S404 as illustrated in FIG. 26 are equivalent to the processes in the steps S101 to S104 as illustrated in FIG. 17A and FIG. 17B and thus its description is omitted.

In a step S405, when it is determined that there are some periodic changes in the brightness data 450 included in the brightness-data control table 400, the display-brightness determination unit 85 in the display device 10B shifts the process to a step S406. For example, such periodic changes may be changes in brightness (illuminance) based on changes in brightness (illuminance) based on the time intervals at which the direction indicators 370 blink or the intervals at which street lamps emit light.

In the step S406, the display-brightness determination unit 85 in the display device 10B determines the display-brightness data 500 using the brightness data 450 stored in the brightness-data control table 400, excluding the largest brightness value [cd/m²]. For example, when it is determined that there are periodic changes in the brightness data 450 obtained by the brightness-data acquisition unit 81, the display-brightness determination unit 85 calculates an average upon reducing the maximum value of the brightness value [cd/m²] in a prescribed sampling period, and determines the calculated value to be the display-brightness data 500. In a similar manner to the first embodiment, the value included in the brightness data 450 may be an illuminance value [mlx]. In such a configuration, the display-brightness determination unit 85 determines the display-brightness data 500 using the brightness data 450 stored in the brightness-data control table 400, excluding the largest illuminance value [mlx].

In a step S408, the display-brightness determination unit 85 in the display device 10A outputs the determined display-brightness data 500 to the image generator 173. The image generator 173 applies the value of display brightness indicated by the display-brightness data 500 to the display brightness of the display data (i.e., the virtual image 45).

When it is determined in the step S409 that the processes of controlling display brightness are to be continued, the display-brightness controller 178 in the display device 10B repeats the processes from the step S401. On the other hand, the display-brightness controller 178 terminates the processes when the processes of controlling display brightness are not to be continued.

On the other hand, in the step S405, when it is determined that there is no periodic change in the brightness data 450 included in the brightness-data control table 400, the display-brightness determination unit 85 in the display device 10B shifts the process to a step S407. When it is determined that there is no periodic change in the brightness data 450, in a similar manner to the first embodiment, the display-brightness determination unit 85 may determine the display-brightness data 500 using all the representative values of the brightness data 450 stored in the brightness-data control table 400. The processes in the step S407 and the following steps are equivalent to the processes in the steps S305 to S307 as illustrated in FIG. 25, and thus its description is omitted.

An example case in which the average of the brightness data 450 after the brightness value that caused by the periodic noise is reduced is determined to be the display-brightness data 500 is described with reference to FIG. 26. However, the display-brightness data 500 is not limited to such an average. It is satisfactory as long as the value of the display-brightness data 500 is smaller than the simple average of the brightness data 450 stored in the brightness-data control table 400. For example, the display-brightness determination unit 85 may determine the display-brightness data 500 to be a median value of the brightness data 450 obtained after the brightness value that caused by the periodic noise is reduced, or may determine the display-brightness data 500 to be a prescribed value (certain value) that corresponds to the values in the brightness data 450 stored in the brightness-data control table 400.

As described above, when periodic noise is detected in the display system according to the second embodiment of the present disclosure, a value smaller than the simple average is determined to be the display-brightness data 500, rather than using the simple average of the brightness data 450. Due to this configuration, display with the display brightness in which the effect of periodic noise is reduced can be implemented. When no periodic noise is detected, the display-brightness data 500 may be determined using a simple average of the brightness data 450. Due to this configuration, the display-brightness controlling processes can be performed on a continual basis regardless of whether periodic noise is detected.

As described above, the display device according to an embodiment of the present disclosure is the display device 10A that controls a display to display the virtual image 45 (an example of display data) that is visually recognized by the viewer 3 in an area ahead of the mobile object. In the display device 10A, the brightness data 450 indicating the brightness of the brightness detection field 300 (an example of a peripheral area), which includes at least some of the background display area 350 (an example of a display area) that serves as the background region of the virtual image 45, is obtained at a prescribed sampling time t (an example of time intervals), and changes in brightness in the brightness detection field 300 are detected based on the obtained brightness data 450. Then, when changes in brightness are detected, in the display device 10A, the display-brightness data 500 that indicates the display brightness of the virtual image 45 is determined such that the length of delay time it takes before the display brightness of the virtual image 45 is made to correspond to the brightness of the brightness detection field 300 is equal to or shorter than the permissible delay time T, and the virtual image 45 is displayed using the determined display-brightness data 500. Due to this configuration, in the display device 10A, undesired changes in display brightness for the viewer 3, which are caused by abrupt changes in brightness of background, are prevented. Accordingly, the visibility of the display data can be improved.

Moreover, in the display device according to an embodiment of the present disclosure, the number of times "n" the delay consideration processes are to be performed on the brightness data 450 (an example of the number of times the brightness data 450 is to be obtained) is determined based on the sampling time t such that the length of delay time it takes before the display brightness of the virtual image 45 is made to correspond to the brightness of the brightness detection field 300 (an example of a peripheral area) is equal to or shorter than the permissible delay time T. For this reason, in the display device 10A, the length of delay time it takes before the display brightness of the display data is made to correspond to the brightness of the background can be made to fall within the permissible delay time T where the viewers 3 do not feel awkward about the changes in display brightness, and the visibility of the display data can be improved.

Further, in a display device according to an embodiment of the present disclosure, the number of times "n" the delay consideration processes are to be performed (an example of the number of times the brightness data 450 is to be obtained) is determined so as to satisfy the condition in the first equation given below. In the first equation given below, n indicates the number of times the delay consideration processes are to be performed, and t indicates a sampling time t (an example of time intervals). T indicates the permissible delay time.

$$nt < T \qquad \text{First Equation}$$

As described above, in the display device 10A, the length of delay time it takes for making the display brightness to follow the brightness of the background is made to fall within range of the permissible delay time T. Due to this configuration, the display brightness can be made to follow the brightness of the background without causing the viewer 3 to feel awkward.

Moreover, in the display device according to an embodiment of the present disclosure, how the brightness has changed is determined when changes in brightness are detected in the brightness detection field 300 (an example of a peripheral area), and the display-brightness data 500 is determined based on the permissible delay time T that corresponds to how the brightness has changed. As described above, in the display device 10A, different permissible delay times T are used depending on how the brightness of the background changes (for example, changes from a dark condition to a bright condition and changes from a bright condition to a dark condition). Due to this configuration, the length of delay time it takes to change the display brightness can be changed.

Further, the display system according to an embodiment of the present disclosure is provided with the display device 10A including the screen 15 through which the light diverges (an example of an optical element) and the light deflector 13 (an example of a scanner) that scans the screen 15 two-dimensionally using the light emitted from the light-source device 11 (an example of a light source). The display device 10A displays the virtual image 45 formed by the light diverging through the screen 15. The display system 1A is provided with the brightness sensor 70 (an example of a detector) that detects the brightness of the brightness detection field 300 (an example of a peripheral area), the front windshield 50 (an example of a reflector) that reflects the diverging light diverging through the screen 15, and the free-form surface mirror 30 (an example of an imaging optical system) that projects the diverging light diverging through the screen 15 towards the front windshield 50 to form the virtual image 45. Accordingly, in the display system 1A, undesired changes in display brightness for the viewer 3, which are caused by abrupt changes in brightness of background, can be prevented. Accordingly, the visibility of the display data can be improved.

A display-brightness control method according to an embodiment of the present disclosure is executed by the display device 10A that controls a display to display the virtual image 45 (an example of display data) that is visually recognized by the viewer 3 ahead of a mobile object. The display-brightness control method includes a step of obtaining the brightness data 450 indicating the brightness of the brightness detection field 300 (an example of a peripheral area), which includes at least some of the background display area 350 (an example of a display area) that serves as the background region of the virtual image 45, at a prescribed sampling time t (an example of time intervals), a step of detecting a change in brightness in the peripheral area 300 based on the brightness data 450 obtained in the obtaining step, a step of determining the display-brightness data 500 that indicates the display brightness of the virtual image 45 when the change in brightness is detected, such that the length of delay time it takes before the display brightness of the virtual image 45 is made to correspond to the brightness of the brightness detection field 300 (an example of a peripheral area) is equal to or shorter than the permissible delay time T, and a step of displaying the virtual image 45 using the display-brightness data 500 determined in the step of determining. Due to this configuration, according to the display-brightness control method according to an embodiment of the present disclosure, undesired changes in display brightness for the viewer 3, which are caused by abrupt changes in brightness of background, can be prevented. Accordingly, the visibility of the display data can be improved.

Moreover, in the display device according to an embodiment of the present disclosure, the brightness data 450 is stored in the brightness-data control table 400 (an example of a storage area) in chronological order, and the oldest brightness data 450 is deleted when no free space is available in the brightness-data control table 400. Due to this configuration, in the display device 10A, the length of delay time it takes before the obtained brightness data 450 is reflected in the display brightness can efficiently be controlled by repeating addition or deletion in chronological order, and thus the effect of the periodic noise of the brightness of the background can be reduced.

Further, in a display device according to an embodiment of the present disclosure, the brightness data 450 indicating the brightness of the brightness detection field 300 (an example of a peripheral area), which contains the background display area 350 (an example of a display area), is obtained. Due to this configuration, in the display device 10A, changes in the brightness of the background of the background display area 350 on which the virtual image 45 (an example of display data) is to be superimposed can completely be reflected in the display brightness of the virtual image 45.

Moreover, in the display device according to an embodiment of the present disclosure, the brightness data 450 is obtained at an interval equal to or shorter than an interval of a specific change in brightness caused in the brightness detection field 300 (an example of a peripheral area). Due to this configuration, in the display device 10A, undesired periodic noise for the viewer 3 in the brightness of the background are detected, and the effect of the periodic noise on the display brightness can further be reduced.

Further, in a display device according to an embodiment of the present disclosure, when the specific change in brightness, which occurs in the brightness detection field 300 (an example of a peripheral area), exists in the brightness data 450 stored in the brightness-data control table 400 (an example of a storage area), the display-brightness data 500 is determined based on a representative value of the brightness data 450 excluding the highest brightness data, rather than based on all the representative values of the brightness data 450 stored in the brightness-data control table 400. Due to this configuration, in the display device 10B, when periodic noise is detected, a value smaller than the simple average is determined to be the display-brightness data 500 rather than using the simple average of the brightness data 450. Due to this configuration, display with the display brightness in which the effect of periodic noise is reduced can be implemented.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

An example case in which a display device according to an embodiment of the present disclosure is a heads-up display (HUD) provided for a vehicle as an example of the mobile object is described as above. However, no limitation is indicated thereby. For example, a display device according to an embodiment of the present disclosure may be a head-mounted display. A display device according to an embodiment of the present disclosure that is applied to such a head-mounted display superimposes a virtual image on the outside image. Further, a display device according to an embodiment of the present disclosure may be applied to devices such as a see-through display in which the screen is made transmissive such that the outside scenery (background image) becomes viewable.

The functional units according to the embodiments of the present disclosure may be implemented by a computer-executable program written by legacy programming language or object-oriented programming language such as assembler language, C language, C++ language, C #language, and Java (registered trademark), and the program can be distributed via telecommunication line.

Moreover, the program that implements the functional units according to the embodiments of the present disclosure may be distributed upon being written on a computer-readable recording medium such as a ROM, an electrically erasable and programmable read only memory (EEPROM), an erasable programmable read only memory (EPROM), a flash memory, a flexible disk (FD), a compact disc read only memory (CD-ROM), a compact disc rewritable (CD-RW), a digital versatile disk (DVD) ROM, a DVD-RAM, a DVD-RW, a Blu-ray disc, a secure digital (SD) card, and a magneto-optical disc (MO).

Further, all or some of the functional units according to the embodiments of the present disclosure may be implemented, for example, on a programmable device (PD) such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, hardware description language (HDL), Very High Speed Integrated Circuit Hardware Description Language (VHDL), or Verilog HDL.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A display device, comprising:
circuitry configured to
obtain brightness data indicating a brightness in a peripheral area at each of prescribed time intervals, the peripheral area including at least a part of a display area that serves as a background of display data,
store the obtained brightness data in a memory;
detect a change in the brightness in the peripheral area to a new brightness, based on the obtained brightness data, and
determine, when the change in brightness is detected, display-brightness data that indicates changes in display brightness of the display data over time, so that length of a delay time, which is a period of time taken to transition the display brightness of the display data to correspond to the new brightness of the peripheral area, is equal to or shorter than a determined permissible delay time,
wherein the display data is displayed using the determined display-brightness data.

2. The display device according to claim 1, wherein the circuitry is further configured to determine a number of times the brightness data is to be obtained based on the prescribed time intervals, to make the length of the delay time equal to or shorter than the determined permissible delay time.

3. The display device according to claim 2,
wherein the circuitry is further configured to determine the number of times the brightness data is to be obtained to satisfy an equation $nt<T$, where n denotes the number of times the brightness data is to be obtained,
t denotes a length of the prescribed time intervals, and
T denotes the determined permissible delay time.

4. The display device according to claim 1,
wherein the obtained brightness data is stored in the memory in chronological order, and
wherein, when no free space is available in the memory, the circuitry is further configured to delete the brightness data that is oldest.

5. The display device according to claim 1, wherein the circuitry is further configured to determine the display-brightness data at a particular time to be an average value of the stored brightness data over a range of times.

6. The display device according to claim 1, wherein the circuitry is further configured to determine the display-brightness data at a particular time to be a median value of the stored brightness data over a range of times.

7. The display device according to claim 1,
wherein, when the change in brightness is detected, the circuitry is further configured to determine a state of the detected change in brightness, and
wherein the circuitry is further configured to determine the display-brightness data based on the determined permissible delay time, which is determined according to the determined state.

8. The display device according to claim 1, wherein the circuitry is further configured to obtain the brightness data indicating the brightness of the peripheral area, which contains the display area.

9. The display device according to claim 1, further comprising:
an optical element through which light diverges; and
a scanner to scan the optical element two-dimensionally using light emitted from a light source,
wherein a virtual image formed by diverging light that diverges as passing through the optical element is displayed.

10. The display device according to claim 1, wherein the circuitry is further configured to obtain the brightness data at an interval equal to or shorter than an interval of a specific change in the brightness caused in the peripheral area.

11. The display device according to claim 10,
wherein the circuitry is further configured to determine the display-brightness data at a particular time based on a representative value of the stored brightness data,
wherein, when the specific change in brightness exists in the stored brightness data, the circuitry is further configured to determine the display-brightness data at the particular time based on the representative value of the stored brightness data, excluding the brightness data whose brightness is highest.

12. The display device of claim 1, wherein the circuitry is further configured to determine the display-brightness data for a particular time based on the brightness data obtained at each of a particular number of times, the particular number of times being variable and based on the determined permissible delay time.

13. A display system comprising:
a display device including circuitry to
obtain brightness data indicating a brightness in a peripheral area at each of prescribed time intervals, the peripheral area including at least a part of a display area that serves as a background of display data,
store the obtained brightness data in a memory,
detect a change in the brightness in the peripheral area to a new brightness, based on the obtained brightness data, and
determine, when the change in brightness is detected, display-brightness data that indicates changes in display brightness of the display data over time, so that a length of a delay time, which is a period of time taken to transition the display brightness of the display data to correspond to the new brightness of the peripheral area, is equal to or shorter than a determined permissible delay time, wherein the display data is displayed using the determined display-brightness data;
a detector to detect the brightness of the peripheral area;
a reflector to reflect diverging light diverging through an optical element; and
an imaging optical system to project the diverging light diverging through the optical element towards the reflector to form the virtual image.

14. A mobile object, comprising:
the display system according to claim 13,
wherein the reflector is a front windshield.

15. A method of controlling display brightness, xe method comprising:
obtaining brightness data indicating a brightness in a peripheral area at each of prescribed time intervals, the peripheral area including at least a part of a display area that serves as a background of display data;
detecting a change in the brightness in the peripheral area to a new brightness, based on the obtained brightness data;
determining, when the change in brightness is detected, display-brightness data that indicates changes in display brightness of the display data over time, such that a length of a delay time, which is a period of time taken to transition the display brightness of the display data to correspond to the new brightness of the peripheral area, is equal to or shorter than a determined permissible delay time; and displaying the display data using the determined display-brightness.

16. A non-transitory computer-readable non transitory recording medium storing a program for causing a computer to execute the method according to claim 15.

* * * * *